United States Patent
Trudeau

(10) Patent No.: US 10,081,429 B2
(45) Date of Patent: Sep. 25, 2018

(54) AIR DIFFUSER SYSTEMS, METHODS, AND APPARATUSES

(71) Applicant: The Boeing Company, Huntington Beach, CA (US)

(72) Inventor: Matthew George Trudeau, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1051 days.

(21) Appl. No.: 14/336,926

(22) Filed: Jul. 21, 2014

(65) Prior Publication Data

US 2016/0194086 A1   Jul. 7, 2016

(51) Int. Cl.
  *B64D 13/06*   (2006.01)
  *F15D 1/00*   (2006.01)
  *F15D 1/02*   (2006.01)

(52) U.S. Cl.
  CPC .............. *B64D 13/06* (2013.01); *F15D 1/006* (2013.01); *F15D 1/009* (2013.01); *F15D 1/02* (2013.01);
  (Continued)

(58) Field of Classification Search
  CPC . F04D 3/00; Y02T 50/44; Y02T 50/56; B64D 13/06; B64D 2013/0625;
  (Continued)

(56) References Cited

U.S. PATENT DOCUMENTS 2,820,406 A   1/1958 Argentieri
3,058,491 A * 10/1962 Myhre .................. F24F 11/047
                                                             138/41

(Continued)

FOREIGN PATENT DOCUMENTS

DE           197 58 275      7/1998
DE      10 2007 019 539     10/2008
(Continued)

OTHER PUBLICATIONS

Low-Swirl Burner, Turbulent Premixed Combustion Research at Berkeley Lab Center for Computational Sciences and Engineering, downloaded from http://ccse.lbl.gov/Research/Combustion/lowSwirl.html on Jul. 14, 2014.

(Continued)

*Primary Examiner* — Gregory Huson
*Assistant Examiner* — Dana Tighe
(74) *Attorney, Agent, or Firm* — Dascenzo Intellectual Property Law, P.C.

(57) ABSTRACT

Aircraft, air conditioning systems, and air diffusers that may be used to create a quiet, comfortable environment within an aircraft cabin are disclosed. For example, an aircraft cabin air diffuser, which may be used in an air conditioning system and/or an aircraft, may include an inlet section, a neck section downstream of the inlet section, an outlet section downstream of the neck section, and a flow controller within the neck section. The flow controller may be a passive pressure controller (configured to affect air flow through the passive pressure controller in response to an air pressure differential across the passive pressure controller) and/or a vortex inducer (configured to create a vortex of air downstream of the vortex inducer).

20 Claims, 6 Drawing Sheets

(52) U.S. Cl.
CPC ............... *B64D 2013/0622* (2013.01); *B64D 2013/0625* (2013.01); *B64D 2013/0688* (2013.01); *Y02T 50/44* (2013.01); *Y02T 50/56* (2013.01)

(58) Field of Classification Search
CPC .... B64D 2013/0622; B64D 2013/0688; F15D 1/006; F15D 1/009; F15D 1/02
USPC ..................... 454/71, 206, 262; 415/207
See application file for complete search history.

(56) References Cited

U.S. PATENT DOCUMENTS

| | | | |
|---|---|---|---|
| 4,896,588 A | 1/1990 | Monda et al. | |
| 4,971,768 A * | 11/1990 | Ealba | B01F 5/0643 165/160 |
| 5,209,259 A | 5/1993 | Dear et al. | |
| 5,929,396 A | 7/1999 | Awad | |
| 6,413,159 B1 | 7/2002 | Bates, III et al. | |
| 6,920,959 B2 | 7/2005 | Han et al. | |
| 7,100,356 B2 | 9/2006 | Han et al. | |
| 7,802,651 B2 | 9/2010 | Park et al. | |
| 8,118,648 B2 * | 2/2012 | Bruggen | B64D 13/00 454/76 |
| 8,616,944 B2 * | 12/2013 | Chambo | B60H 1/249 454/162 |
| 2007/0157803 A1 | 7/2007 | McNeil et al. | |
| 2009/0239463 A1 * | 9/2009 | Goenka | B60H 1/00564 454/331 |
| 2010/0154468 A1 | 6/2010 | Shaska et al. | |
| 2013/0327891 A1 | 12/2013 | Zhang et al. | |

FOREIGN PATENT DOCUMENTS

| | | |
|---|---|---|
| EP | 2 851 298 | 3/2015 |
| RO | 130182 | 4/2015 |
| WO | WO 99/05459 | 2/1999 |

OTHER PUBLICATIONS

European Patent Office, Extended European Search Report for related foreign patent EP 15 17 7459, dated Nov. 23, 2015.
Machine generated English language translation of abstract for DE 197 58 275 downloaded from Espacenet.com on Mar. 9, 2016.
Machine generated English language translation of abstract for RO 130182 downloaded from Espacenet.com on Mar. 9, 2016.
Machine generated English language translation of abstract for DE 10 2007 019 539 downloaded from Espacenet.com on Mar. 9, 2016.

* cited by examiner

US 10,081,429 B2

AIR DIFFUSER SYSTEMS, METHODS, AND APPARATUSES

FIELD

The present disclosure relates to air diffuser systems, methods, and apparatuses.

BACKGROUND

Many aircraft are designed to fly at high altitudes, e.g., from 10,000 feet (ft) (about 3,000 meters (m)) to upwards of 41,000 ft (about 12,500 m), while providing a safe, comfortable cabin environment. To maintain this cabin environment, a typical aircraft includes an air conditioning system, with appropriate pressure, temperature, and moisture regulation, to circulate fresh air within the passenger cabin. An aircraft air conditioning system is sometimes referred to as an air conditioning pack, an air handling system, and/or an air circulation system. An air conditioning system may circulate outside air mixed with an approximately equal amount of highly filtered air from the passenger cabin. The combined outside and filtered air is ducted to the cabin and distributed to cabin outlets throughout the cabin, typically louvers, air distribution rails, vents, and personal air outlets (e.g., eyeball gaspers above passenger seating). Air diffusers direct the ducted air into the cabin outlets.

Inside the cabin, air diffusers and outlets are generally arranged along the side walls of the cabin and sometimes along the overhead. The air flows in generally circular patterns and exits through grilles, often on either side of the cabin floor, and, on airplanes with overhead recirculation, the air may exit through overhead grilles. For commercial aircraft, the FAA (Federal Aviation Administration) requires a minimum air flow and cabin pressure. For new aircraft, the minimum air flow is 0.55 pounds per minute (lbs/min) per occupant (about 250 grams per minute (g/min) per occupant) and the minimum cabin pressure is 0.75 bar (75 kilopascal (kPa)).

The cabin air flow is continuous and is used for maintaining a comfortable cabin temperature, pressurization, and/or overall air quality. About half of the air exiting the cabin is exhausted from the airplane through one or more outflow valves in the fuselage, which also controls the cabin pressure. The other half is drawn through high efficiency filters, and then is recirculated with fresh outside air, as discussed.

For passenger comfort, air flow into the cabin should be quiet, relatively uniform, and generally unobtrusive. However, in addressing these needs, designers must balance weight and complexity with comfort.

SUMMARY

Aircraft, air conditioning systems, and air diffusers of the present disclosure may be used to create a quiet, comfortable environment within an aircraft cabin. The systems and apparatuses may be configured to flow air at or above the FAA minimum requirement of 0.55 lbs/min per occupant (about 250 g/min per occupant) while producing a low noise level.

Aircraft cabin air diffusers, as presently disclosed, comprise an inlet section to receive air flow, an outlet section to discharge air flow into an aircraft cabin, a neck section to direct air flow from the inlet section to the outlet section, and a flow controller to passively regulate flow and/or pressure, and/or to create a vortex within the air diffuser to distribute flow and/or to reduce air flow noise. The inlet section, the neck section, and the outlet section are operatively coupled to direct air flow from the inlet section to the outlet section. The flow controller may be a passive pressure controller (configured to affect air flow through the passive pressure controller in response to an air pressure differential across the passive pressure controller) and/or a vortex inducer (configured to create a vortex of air downstream of the vortex inducer).

DESCRIPTION

Figure 1:
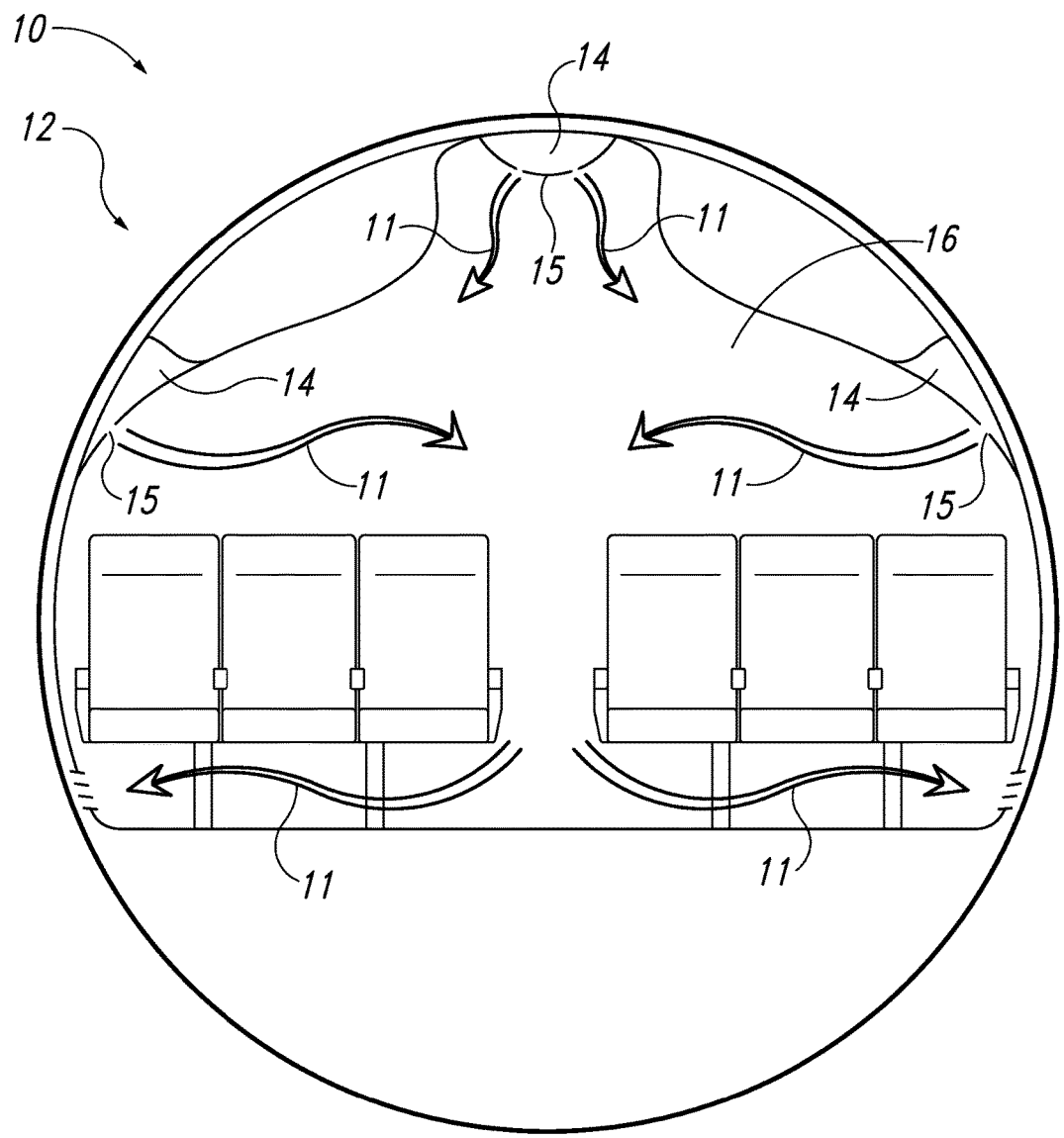
FIG. 1 is a cross-sectional schematic representation of an aircraft interior.

The present disclosure relates to systems, methods, and apparatuses for diffusing air within an aircraft. FIGS. 1-7 are various views of aircraft 10, air conditioning systems 12, air diffusers 14, and associated components. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure. Elements that serve a similar, or at least substantially similar, purpose are labeled with numbers consistent among the figures. Like numbers in each of the figures, and the corresponding elements, may not be discussed in detail herein with reference to each of the figures. Similarly, all elements may not be labeled in each of the figures, but reference numerals associated therewith may be used for consistency. Elements, components, and/or features that are discussed with reference to one or more of the figures may be included in and/or used with any of the figures without departing from the scope of the present disclosure.

FIG. 1 is a cross-sectional schematic representation of an aircraft interior illustrating where and how an air diffuser 14 may be employed within an aircraft 10 to circulate air in an aircraft cabin 16. Air flow is indicated by arrows 11. Air diffusers 14 are typically part of an air conditioning system 12, sometimes referred to as an air conditioning pack, on board the aircraft 10. The air conditioning system 12 circulates air within the aircraft cabin 16 by providing air flow to air diffusers 14 fluidically coupled to the aircraft cabin 16. The air may flow into the aircraft cabin 16 through cabin air vents 15, typically along the side walls, above the stow bins, and/or along the overhead of the aircraft cabin 16. Further, the air conditioning system 12 may supply air to passenger-controlled gaspers, generally above each seat.

An aircraft 10 may be configured to transport one or more passengers, including crew. For example, commercial aircraft may be configured to transport up to several hundred passengers. Several air diffusers 14, and any associated cabin air vents 15, may be distributed along the aircraft cabin 16 to provide relatively uniform flow of fresh air to all occupants.

Air diffusers 14 may be configured to fit within the space constraints of an aircraft 10 and/or aircraft cabin 16. Typically, an air conditioning system 12 has ducts running along the length of the aircraft 10 fuselage, often near the stow bins and the overhead in commercial transport aircraft 10. Air diffusers 14 may be connected to the ducts along the fuselage and may redirect some of the air flowing in the ducts into the aircraft cabin 16. To accommodate this type of air flow within the space constraints, air diffusers 14 may be generally compact and/or curved.

Air diffusers 14 are configured to supply air as part of an air conditioning system 12 at a rate to maintain the comfort and health of occupants. FAA regulations currently require a minimum air flow of 0.55 lbs/min per occupant (about 250 g/min per occupant). When flying, aircraft with pressurized cabins typically maintain the air pressure at the equivalent of about 6,000-8,000 ft. altitude (about 1,800-2,400 m), which is about 0.75-0.80 bar (about 75-80 kPa). At 75 kPa and a comfortable cabin temperature of about 20-25° C., the FAA requirement corresponds to an air flow of about 10 cubic feet per minute ($ft^3$/min) per occupant (about 280 liters per minute (L/min) per occupant). An aircraft 10 and/or an air conditioning system 12 may incorporate more than one air diffuser 14 to handle the required air flow and/or to distribute the air flow relatively equally among the occupants. Each air diffuser 14, and associated air handling components, adds weight and complexity to an aircraft 10. Hence, an aircraft 10 may be designed to minimize the number of required air diffusers 14 (thus saving weight and, ultimately, fuel and maintenance costs). Since an aircraft 10 is rated for a certain number of occupants, including crew and passengers, a smaller number of air diffusers 14 increases the volumetric and/or mass flow of the air that each air diffuser 14 handles such that at least the minimum flow is achieved. The aircraft 10 may incorporate less than one air diffuser 14 for every two rated occupants, for every three rated occupants, and/or for every four rated occupants. For example, the aircraft 10 may include less than 0.5, less than 0.4, less than 0.37, less than 0.33, less than 0.30, less than 0.28, less than 0.26, less than 0.24, less than 0.22, less than 0.2, about 0.4, about 0.37, about 0.33, about 0.3, about 0.25, and/or about 0.22 air diffusers per rated occupant. Air diffusers 14 may be configured to handle air flow of about the required rate or greater. For example, air diffusers 14 may be configured to flow air at greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 L/min, greater than 900 L/min, greater than 1,000 L/min, greater than 1,100 L/min, greater than 1,200 L/min, greater than 1,300 L/min, less than 1,500 L/min, less than 1,300 L/min, and/or 900-1,300 L/min.

An air diffuser 14 may be employed in an aircraft 10 and/or an air conditioning system 12 to circulate air in an aircraft cabin 16. Circulating may include supplying air to an aircraft cabin 16 through the air diffuser 14. The air diffusers 14 may be configured to supply the aircraft cabin 16 with a generally uniform air flow and/or with an air flow of at least 250 g/min per rated occupant. Further, circulating may include maintaining an air pressure in an aircraft cabin 16 sufficient for safe, comfortable travel. For example, the air pressure may be greater than 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, 70-102 kPa, about 90 kPa, about 80 kPa, and/or about 75 kPa. Unless stated clearly otherwise, all air pressure values are absolute air pressure values.

Air diffusers 14 may be configured and/or used to establish a relatively quiet aircraft cabin environment by creating a sound level not substantially more than other ambient noise in an aircraft cabin 16, at least at some frequencies that interfere with speech and/or at high frequencies. At higher flow rates, conventional air conditioning systems may make aircraft cabins noisy. However, the air diffusers 14 of the present disclosure may be configured to provide quiet air flow, even at high flow rates, without compromising the typical space and weight constraints of conventional air diffusers. Aircraft cabins 16 may have many noise sources, particularly when the aircraft 10 is flying. Air diffusers 14 may be configured to contribute little to the overall sound level in an aircraft cabin 16. The sound level from an air diffuser 14 in use may be less than 20 decibels (dB), less than 10 dB, less than 5 dB, less than 3 dB, less than 2 dB, or less than 1 dB more than other ambient noise in aircraft cabin 16, at least at particular frequencies. For comparison, typical ambient noise in an aircraft cabin such as aircraft cabin 16 may be greater than 45 dB, greater than 50 dB, greater than 55 dB, greater than 60 dB, greater than 65 dB, greater than 70 dB, greater than 75 dB, greater than 80 dB, and/or greater than 85 dB. The sound level contribution from an air diffuser 14 may include frequencies of 0.1 kilohertz (kHz), 0.2 kHz, 0.5 kHz, 1 kHz, 2 kHz, 3 kHz, 4 kHz, 5 kHz, 8 kHz, 10 kHz, 12 kHz, 15 kHz, 20 kHz, 0.1-10 kHz, 0.5-4 kHz, 1-4 kHz, 2-4 kHz, 3-10 kHz, 5-10 kHz, greater than 5 kHz, and/or greater than 8 kHz. An alternate measure of interfering sound level is the speech interference level (SIL). The SIL is the arithmetic mean of the sound levels of a noise at three bands with center frequencies of 1 kHz, 2 kHz, and 4 kHz. These bands contain the frequencies that are most important for speech communication. The SIL of an air diffuser 14 in use may be less than 55 dB, less than 52 dB, less than 50 dB, less than 48 dB, less than 46 dB, or less than 44 dB.

Figure 2:
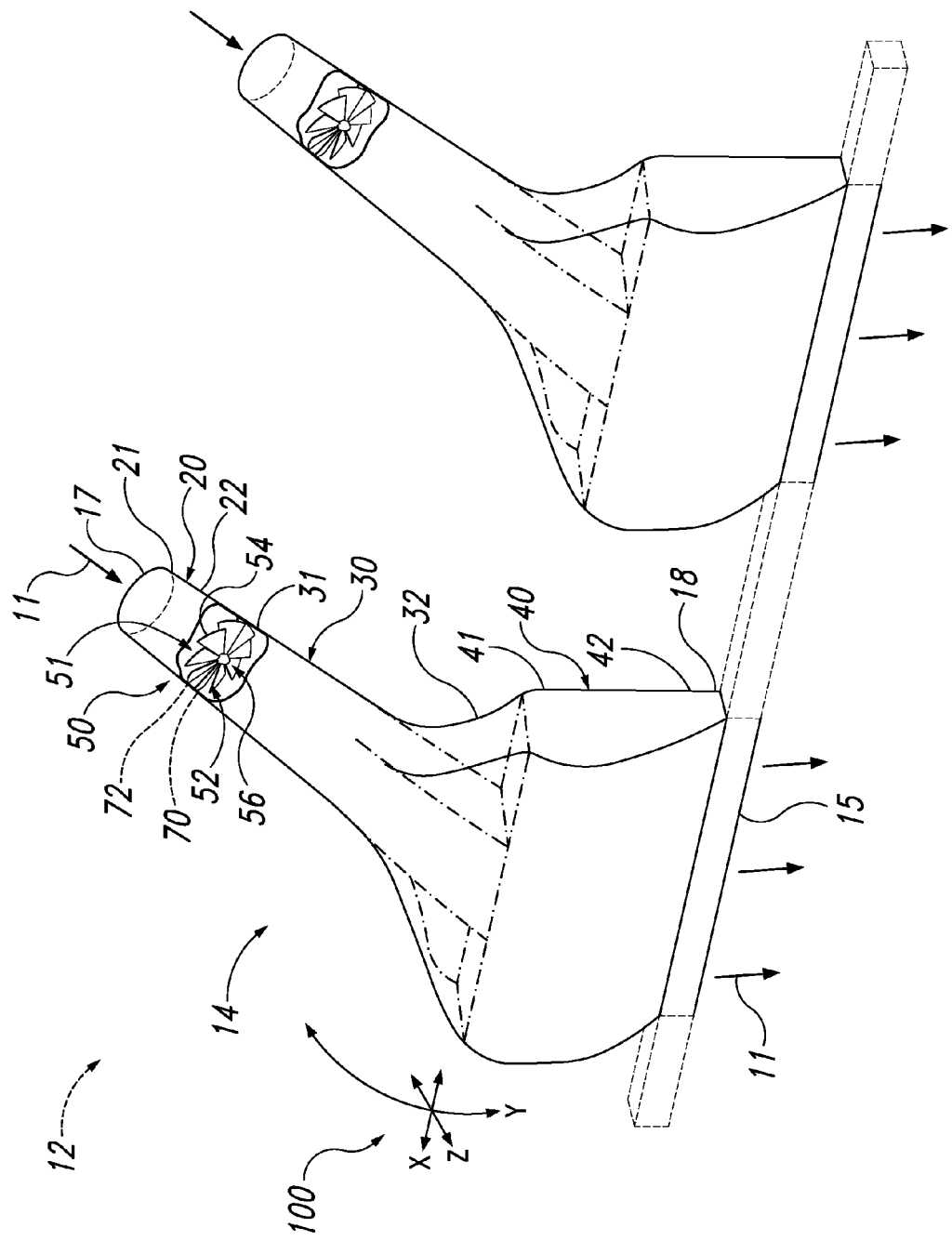
FIG. 2 is a non-exclusive, illustrative example of air diffusers as installed in an aircraft interior.

FIG. 2 shows an example of two air diffusers 14 as part of an air conditioning system 12. In the figure, the two air diffusers are arranged to supply air into an aircraft cabin through one or more cabin air vents 15. Each air diffuser 14 may be arranged to supply air through a dedicated air vent 15, as shown in solid line in FIG. 2, or at least two air diffusers 14 optionally may be arranged to supply air through a single, shared air vent 15 (also called an air rail), as shown in dotted line in FIG. 2. Air diffusers 14 generally are configured to accept input air flow 11 through an entrance, also called an air diffuser upstream end 17, to transmit the air flow 11 through the air diffuser, and to spread the air flow 11 through a relatively wide exit, also called an air diffuser downstream end 18. The air diffusers 14 may be configured, each independently, to supply air at a substantially constant volumetric flow rate, mass flow rate, pressure, and/or flow velocity into the aircraft cabin, provided that the air conditioning system 12 is supplying a minimum threshold of air (volume, mass, and/or pressure) to each air diffuser 14. Thus, the air conditioning system 12 may be configured to control the supply of air into the aircraft cabin through the configuration of the air diffusers 14 rather than the volume, mass, and/or pressure of air delivered to the air diffusers 14.

Air diffusers 14 comprise an inlet section 20, proximate to an air diffuser upstream end 17, an outlet section 40, proximate to an air diffuser downstream end 18, and a neck section 30 that spans between the inlet section 20 and the outlet section 40. Each of these sections, and the air diffuser 14 as a whole, has an open interior, or a channel, to allow air to flow through the section and air diffuser 14. Hence, the sections, and the air diffuser 14, may be described as being hollow, defining a cavity, defining an open volume, and/or being porous. Each of the sections is operatively connected to (and/or extends from) the neighboring section(s) such that air may flow into the inlet section 20, through the neck section 30, and out the outlet section 40. The sections may each be composed of one or more parts. Two or more sections may share component parts. For example, one monolithic piece may include an inlet section 20, a neck section 30, and an outlet section 40. As another example, the inlet section may be one piece, the neck section may be a second piece, and the outlet section may be a third piece of an air diffuser 14 assembly.

Generally, each section has an upstream end (the end configured to receive air flow) and a downstream end (the end configured to emit air flow). The inlet upstream end 21 is proximate to the air diffuser upstream end 17, the end where air flow 11 is configured to enter the air diffuser 14. The outlet downstream end 42 is proximate to the air diffuser downstream end 18, the end where air flow 11 is configured to exit the air diffuser 14. The inlet section 20 at the inlet downstream end 22 is operatively coupled to the neck section 30 at the neck upstream end 31. The neck section 30 at the neck downstream end 32 is operatively coupled to the outlet section 40 at the outlet upstream end 41. As illustrated in FIG. 2, the sections each independently may be smooth and arcuate (illustrated in solid lines) or angular and boxy (illustrated in dash-dot lines). Additionally or alternatively, the transitions between the sections may be abrupt or smooth.

Air diffusers 14 also comprise a flow controller 50 within the air flow path of the air diffuser 14. The flow controller 50 is spaced away from the air diffuser upstream end 17 and the air diffuser downstream end 18, and may be at least partially in the interior of one or more of the inlet section 20, the neck section 30, and the outlet section 40. Generally, the flow controller 50 is located toward the air diffuser upstream end 17, generally within and/or proximate to the neck section 30. As discussed further herein, flow controllers 50 may be passive pressure controllers 70 and/or vortex inducers 72, i.e., flow controllers 50 may affect the speed and/or direction of air flow through the air diffuser 14. Generally, flow controllers 50 include one or more vanes 54 that separate one or more flow channels 56 that allow air to flow through the flow controller 50 from the flow controller upstream end 51 to the flow controller downstream end 52.

Air diffusers 14 are three dimensional objects which may be oriented in a variety of ways. To facilitate discussion of features, structures, and components of air diffusers 14, this disclosure makes reference to three orthogonal directions, indicated by coordinate frame 100: a longitudinal direction (indicated as the y-direction), a lateral direction (indicated as the x-direction), and a transverse direction (indicated as the z-direction). The longitudinal direction is a direction along the geometric center of the air diffuser 14 following the direction of bulk air flow through the air diffuser 14, spanning the air diffuser 14 from the air diffuser upstream end 17 to the air diffuser downstream end 18. As discussed further herein, air diffusers generally are curved and/or define a curved bulk air flow path, and, hence, the longitudinal direction is likewise curved. The lateral direction is orthogonal to the longitudinal direction and generally traverses the widest portion of the air flow channel within the air diffuser 14. A dimension of the air diffuser 14 along the lateral direction is referred to as a lateral width. The transverse direction is orthogonal to both the longitudinal direction and the lateral direction. A dimension of the air diffuser 14 along the transverse direction is referred to as a transverse breadth.

Figure 3:
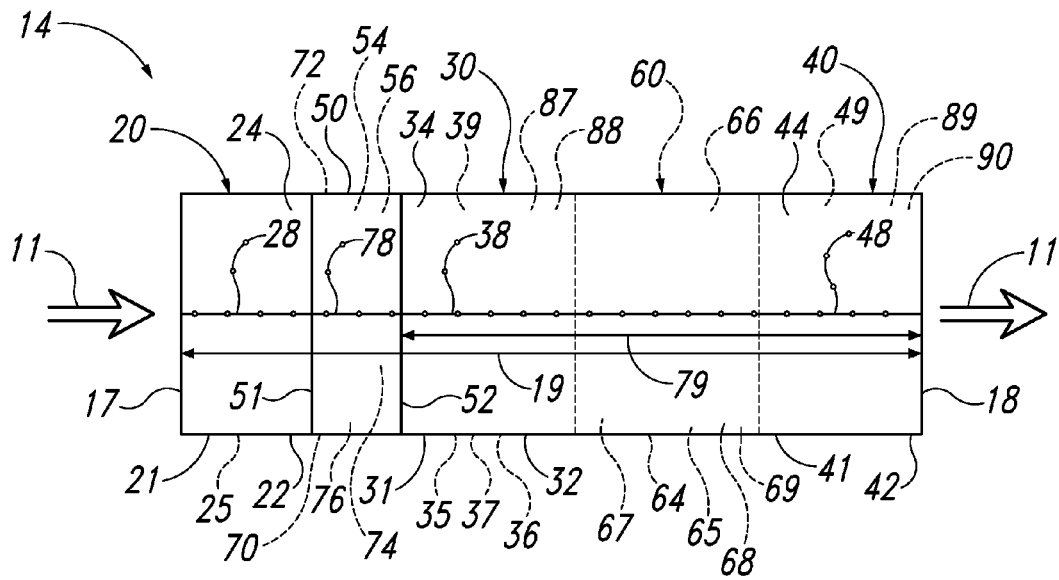
FIG. 3 is a schematic representation of an air diffuser.
Figure 4:
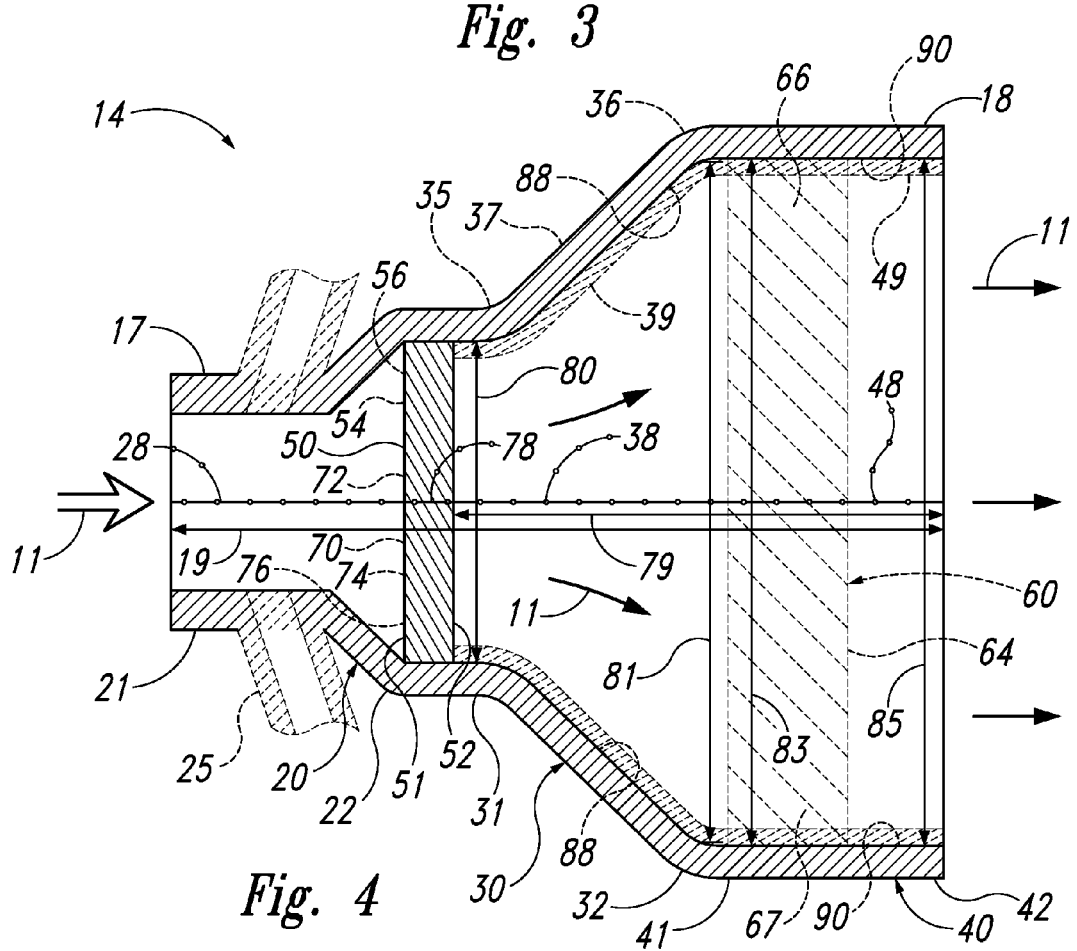
FIG. 4 is a longitudinal cross-sectional view, perpendicular to the transverse axis, of an illustrative, non-exclusive example of an air diffuser.
Figure 5:
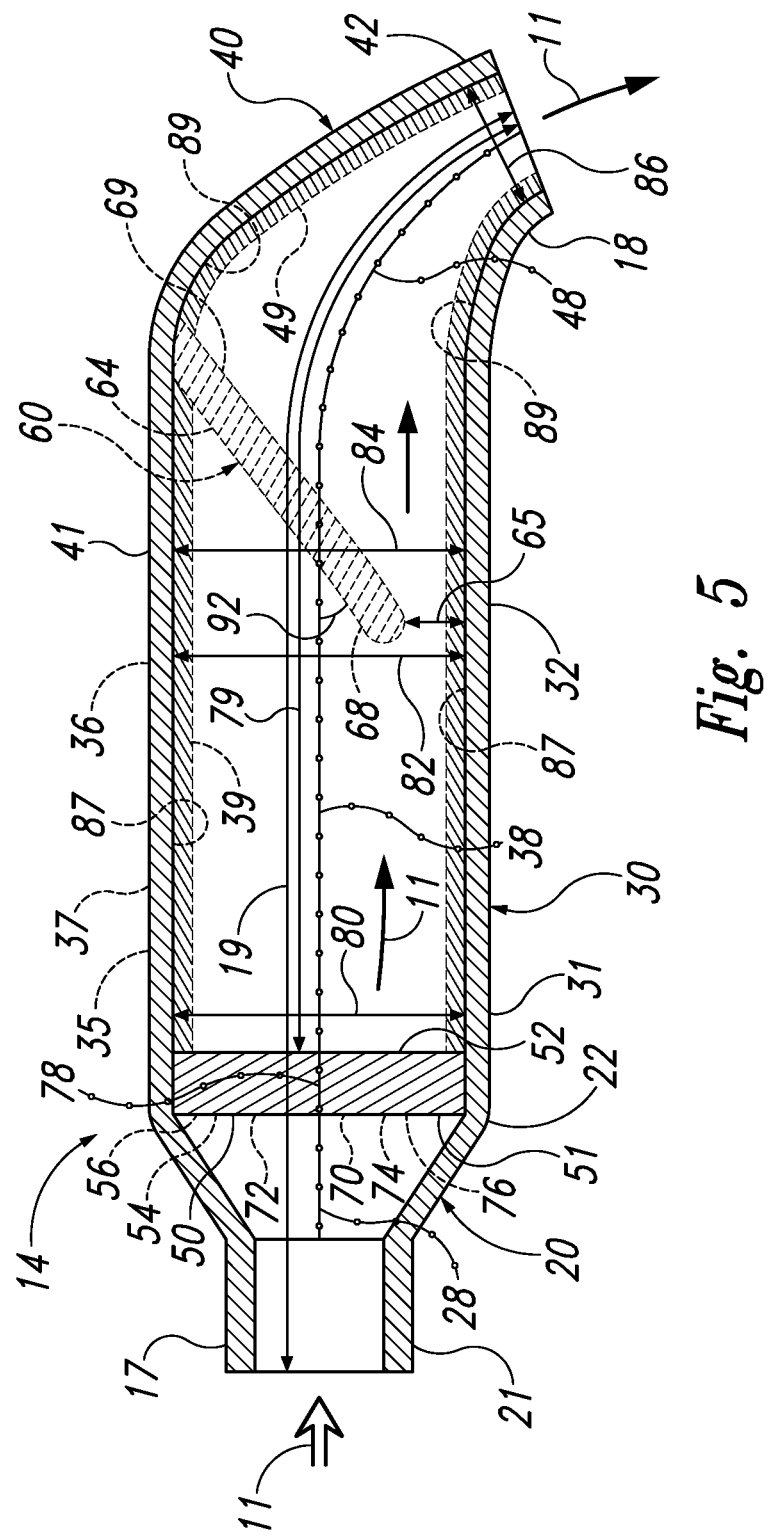
FIG. 5 is a longitudinal cross-sectional view, perpendicular to the lateral axis, of an illustrative, non-exclusive example of an air diffuser.

FIG. 3 is a schematic representation of an air diffuser 14 illustrating the general structure, location and order of the various subcomponents. FIGS. 4-5 are perpendicular cross sections of an illustrative, non-exclusive example of an air diffuser 14.

With reference to FIGS. 3-5, air diffusers 14 may be characterized by an air channel length 19, the length of the geometrical center of the bulk air flow path from the air diffuser upstream end 17 to the air diffuser downstream end 18. Further, air diffusers 14 may be characterized by a characteristic dimension measured perpendicular to the longitudinal direction, for example a lateral width, a transverse breath, a diameter and/or an effective diameter.

The inlet section 20 of an air diffuser 14 is located proximate to the air diffuser upstream end 17 and may be located at the air diffuser upstream end 17. The inlet section 20 generally is configured to create a diverging flow, i.e., the inlet section 20 defines an air flow path that is substantially diverging. However, the inlet section 20 may be configured to create a generally straight flow, i.e., the inlet section 20 defines an air flow path that is substantially straight. In one configuration to create a generally diverging air flow path, the inlet upstream end 21 is smaller than the inlet downstream end 22. Specifically, the inlet section 20 may define an open area, the total cross-sectional area that may allow a fluid to pass, that is smaller at the inlet upstream end 21 than at the inlet downstream end 22.

Generally, the inlet section 20 may be tubular, hollow, and/or define an open volume. The inlet section 20 may be a tube, a generally cylindrical shell, and/or a generally tapered shell. The interior profile (the shape of the cross section of the interior) at the inlet upstream end 21 and/or at the inlet downstream end 22 may be substantially round and/or substantially oval.

The inlet section 20 may be characterized by an inlet central axis 28 between the inlet upstream end 21 and the inlet downstream end 22. A central axis is a line that traverses the geometric centroid of each cross section perpendicular to the longitudinal dimension of an object. The central axis generally extends along the longitudinal direction and generally follows the contour of the object. In the inlet section 20, the inlet central axis 28 generally describes the unobstructed flow of air through the inlet section 20. The inlet central axis 28 typically is a substantially straight line between the center of the inlet upstream end 21 and the inlet downstream end 22. Between the inlet upstream end 21 and the inlet downstream end 22, and generally along the inlet central axis 28, the inlet section 20 may be elongated. The length of the central axis 28 may be greater than 4 millimeters (mm), greater than 6 mm, greater than 8 mm, greater than 10 mm, greater than 12 mm, greater than 15 mm, greater than 20 mm, greater than 25 mm, greater than 30 mm, greater than 40 mm, greater than 50 mm, greater than 60 mm, greater than 80 mm, greater than 100 mm, less than 150 mm, less than 100 mm, less than 80 mm, less than 60 mm, less than 50 mm, 4-100 mm, and/or 10-80 mm.

The inlet section 20 may be configured to direct some air flow away from the outlet section 40 of the air diffuser 14.

Such flow may be directed to gaspers and/or other components of the air conditioning system 12. Flow may be directed away from the outlet section 40 by including one or more branching tubes 25 along the inlet section 20, as best viewed in FIG. 4.

Returning to the broader discussion of FIGS. 3-5, the neck section 30 of an air diffuser 14 is generally a transition section between the inlet section 20 and the outlet section 40. The neck section 30 may include a neck first region 35, proximate to the neck upstream end 31, a neck second region 36, proximate to the neck downstream end 32, and/or a neck transition region 37 between the neck upstream end 31 and the neck downstream end 32. The neck first region 35 and/or the neck upstream end 31 may be configured to couple, and/or be operatively coupled, to the inlet downstream end 22. The neck second region 36 and/or the neck downstream end 32 may be configured to couple, and/or be operatively coupled, to the outlet upstream end 41.

The neck section 30 may be characterized by a neck central axis 38 between the neck upstream end 31 and the neck downstream end 32. The neck central axis 38 generally describes the unobstructed flow of air through the neck section 30. Generally, the neck central axis 38 is continuous with the inlet central axis 28. The neck central axis 38 may be a substantially straight line or may be a substantially curved line between the center of the neck upstream end 31 and the neck downstream end 32. Between the neck upstream end 31 and the neck downstream end 32, and generally along the neck central axis 38, the neck section 30 may be elongated. The length of the central axis 38 may be greater than 10 mm, greater than 12 mm, greater than 15 mm, greater than 20 mm, greater than 25 mm, greater than 30 mm, greater than 40 mm, greater than 50 mm, greater than 60 mm, greater than 80 mm, greater than 100 mm, greater than 150 mm, greater than 200 mm, greater than 300 mm, greater than 400 mm, greater than 500 mm, less than 500 mm, less than 400 mm, less than 300 mm, less than 200 mm, less than 150 mm, less than 100 mm, less than 80 mm, less than 60 mm, less than 50 mm, 20-500 mm, and/or 50-300 mm.

Generally, the neck section 30 may be tubular, hollow, and/or define an open volume. The neck section 30 may be a tube, a generally cylindrical shell, and/or generally an open box. For example, the neck first region 35 may be a tube and/or a generally cylindrical shell. As another example, the neck second region 36 may be a tube and/or generally an open box. The interior profile at the neck upstream end 31 may be substantially round and/or substantially oval. The interior profile at the neck downstream end 32 may be substantially round, substantially oval, substantially oblong, and/or substantially rectangular. Generally, the interior profile at the neck upstream end 31 is different than the interior profile at the neck downstream end 32. Where the profiles differ, the interior profile at the neck downstream end 32 may be larger in one direction (e.g., the lateral direction) and smaller in a perpendicular direction (e.g., the transverse direction) than the interior profile at the neck upstream end 31. The open area at the neck upstream end 31 may be the same as or different than (e.g., smaller than) the open area at the neck downstream end 32. Even where the interior profiles differ, the open area at the neck upstream end 31 may be the same as the open area at the neck downstream end 32. The neck transition region 37, when present, has a non-uniform interior profile, i.e., an interior profile that changes along the neck central axis 38.

The interior of the neck section 30 at the neck upstream end 31 may be characterized by a characteristic dimension 80 that is a lateral width, a transverse breadth, a diameter, and/or an effective diameter. The interior of the neck section 30 at the neck downstream end 32 may have a lateral width 81 that is larger than the characteristic dimension 80 of the interior of the neck section 30 at the neck upstream end 31, as best viewed in FIG. 4. The characteristic dimension 80 may be greater than 20 mm, greater than 30 mm, greater than 40 mm, greater than 50 mm, greater than 70 mm, greater than 100 mm, greater than 150 mm, less than 200 mm, less than 150 mm, less than 100 mm, less than 70 mm, less than 50 mm, 20-150 mm, and/or 50-100 mm. The ratio of the characteristic dimension 80 to the lateral width 81 may be less than 50%, less than 40%, less than 30%, less than 25%, less than 20%, less than 15%, less than 12%, less than 10%, less than 8%, 8-50%, 8-25%, about 20%, about 15%, and/or about 12%. The interior of the neck section 30 at the neck downstream end 32 may have a transverse breadth 82 that is about equal to or smaller than the characteristic dimension 80 of the interior of the neck section 30 at the neck upstream end 31, as best viewed in FIG. 5. The ratio of the transverse breadth 82 to the characteristic dimension 80 may be less than 120%, less than 100%, less than 80%, less than 60%, less than 50%, less than 40%, less than 30%, less than 25%, less than 20%, 20-100%, 30-50%, about 100%, about 50%, about 33%, and/or about 25%. The lateral width 81 may be larger than the transverse breadth 82. The ratio of the transverse breadth 82 to the lateral width 81 may be less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%. The characteristic dimension 80 of the interior of the neck section 30 at the neck upstream end 31 may be greater than 20 mm, greater than 30 mm, greater than 40 mm, greater than 50 mm, greater than 60 mm, greater than 80 mm, greater than 100 mm, less than 100 mm, less than 80 mm, less than 60 mm, less than 50 mm, 30-100 mm, and/or 40-60 mm. The lateral width 81 may be greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm. The lateral width 81 may be substantially the same as or less than the length of the neck central axis 38.

Returning to the broader discussion of FIGS. 3-5, the neck section 30 generally defines a smooth air flow path, approximately following the neck central axis 38, from the neck upstream end 31 to the neck downstream end 32. The air flow path may be substantially straight or substantially curved. Generally, the neck section 30 is configured to direct air entering the neck upstream end 31 into a different direction upon exiting the neck downstream end 32. The air flow path may be characterized by the central axis of the air flow. Where the air flow path is curved, the air flow central axis may have a compound curvature, including bends and/or twists in multiple directions. For example, the plane of principal curvature may be substantially orthogonal to the lateral direction, e.g., the direction along the lateral width 81 of the interior of the neck section 30 at the neck downstream end 32.

Within the interior, the neck section 30 generally has a smooth interior profile. Where the interior profile changes, such as along the neck transition region 37, the interior may have few to no features that could cause significant turbulence and/or undesired turbulence. For example, the interior of the neck section 30 may have arcuate surfaces, rounded corners, no sharp corners, and/or be essentially free of sharp corners. Additionally or alternatively, the neck section 30 may have an angular interior profile and/or an angular interior section which may cause significant turbulence.

The neck section 30 may include neck sound dampening material 39 to reduce noise generated by air flowing through the air diffuser 14. The neck sound dampening material 39 may include a material and/or structure that attenuates, reflects, and/or redirects sound, at least at particular frequencies. The neck sound dampening material 39 may be essentially free of volatile substances and/or particulates that may circulate with the air flow. The neck sound dampening material 39 may be essentially fire resistant and/or resist formation of smoke, vapors, and/or particulate. For example, the neck sound dampening material may include aramid fibers, e.g., products sold under the trade names NOMEX, KEVLAR, TWARON, and TECHNORA ("Nomex" and "Kevlar" are registered trademarks of E. I. du Pont de Nemours and Company of Wilmington, Del.; "Twaron" is a registered trademark of Teijin Aramid B.V. LLC of Arnhem, The Netherlands; and "Technora" is a registered trademark of Teijin Techno Products Limited Corp. of Osaka, Japan). Generally, the neck sound dampening material 39 is located along the interior surface(s) of the neck section 30 and may be directly or indirectly coupled to an interior surface of the neck section 30. The neck sound dampening material 39 may be composed of a continuous section of material and/or a patchwork of material sections. The neck sound dampening material 39 may cover all, substantially all, most, and/or a majority of the interior of the neck section 30. For example, the neck sound dampening material 39 may cover greater than 20%, greater than 40% greater than 50%, greater than 60%, greater than 75%, greater than 90%, about 50%, about 75%, or about 100% of the interior surface area of the neck section 30. The neck section 30 may be completely free or selectively free of neck sound dampening material 39. For example, where the interior of the neck section 30 generally has a transverse surface 88 and a lateral surface 87 (as best viewed in FIGS. 4 and 5 respectively), the lateral surface 87 may be substantially covered by neck sound dampening material 39 and/or the transverse surface 88 may be substantially free of neck sound dampening material 39.

Returning to the broader discussion of FIGS. 3-5, the outlet section 40 of an air diffuser 14 is located proximate to the air diffuser downstream end 18 and may be located at the air diffuser downstream end 18. The outlet section 40 generally is configured to create a broad, uniform flow, at the volume and/or mass flow rates described herein with respect to the air diffuser 14 as a whole, at the outlet downstream end 42.

The outlet section 40 may be characterized by an outlet central axis 48 between the outlet upstream end 41 and the outlet downstream end 42. The outlet central axis 48 generally describes the unobstructed flow of air through the outlet section 40. Generally, the outlet central axis 48 is continuous with the neck central axis 38. The outlet central axis 48 may be a substantially straight line or may be a substantially curved line between the center of the outlet upstream end 41 and the outlet downstream end 42. Between the outlet upstream end 41 and the outlet downstream end 42, and generally along the outlet central axis 48, the outlet section 40 may be elongated. The length of the central axis 48 may be greater than 10 mm, greater than 12 mm, greater than 15 mm, greater than 20 mm, greater than 25 mm, greater than 30 mm, greater than 40 mm, greater than 50 mm, greater than 60 mm, greater than 80 mm, greater than 100 mm, greater than 150 mm, greater than 200 mm, greater than 300 mm, greater than 400 mm, greater than 500 mm, less than 500 mm, less than 400 mm, less than 300 mm, less than 200 mm, less than 150 mm, less than 100 mm, less than 80 mm, less than 60 mm, less than 50 mm, 10-300 mm, and/or 20-100 mm.

Generally, the outlet section 40 may be tubular, hollow, and/or define an open volume. The outlet section 40 may be a tube, generally an open box, and/or generally an open tapered box. The interior profile at the outlet upstream end 41 and/or the outlet downstream end 42 may be substantially round, substantially oval, substantially oblong, and/or substantially rectangular.

The interior of the outlet section 40 at the outlet upstream end 41 may be non-cylindrically symmetric and may have a lateral width 83 (as best view in FIG. 4) that is larger than the transverse breadth 84 (as best viewed in FIG. 5). Similarly, the interior of the outlet section 40 at the outlet downstream end 42 may be non-cylindrically symmetric and may have a lateral width 85 (as best viewed in FIG. 4) that is larger than the transverse breadth 86 (as best viewed in FIG. 5). The ratio of the transverse breadth 84 at the outlet upstream end 41 to the lateral width 83 at the outlet upstream end 41 may be less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%. The ratio of the transverse breadth 86 at the outlet downstream end 42 to the lateral width 85 at the outlet downstream end 42 may be less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%. The lateral width 83 at the outlet upstream end 41 and/or the lateral width 85 at the outlet downstream end 42 may be greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm. The lateral width 83 at the outlet upstream end 41 is generally about the same as the lateral width 85 at the outlet downstream end 42. The transverse breadth 84 at the outlet upstream end 41 and/or the transverse breadth 86 at the outlet downstream end 42 may be greater than 10 mm, greater than 20 mm, greater than 30 mm, greater than 40 mm, greater than 50 mm, greater than 70 mm, greater than 100 mm, greater than 150 mm, less than 200 mm, less than 150 mm, less than 100 mm, less than 70 mm, less than 50 mm, less than 40 mm, less than 30 mm, less than 20 mm, 10-200 mm, 20-100 mm, 20-70 mm, about 20 mm, and/or about 50 mm. The transverse breadth 84 at the outlet upstream end 41 is generally greater than and/or about equal to the transverse breadth 86 at the outlet downstream end 42. The length of the outlet central axis 48 may be less than 80%, less than 60%, less than 50%, less than 40%, less than 30%, less than 25%, less than 20%, 20-80%, 25-60%, about 60%, about 50%, and/or about 40% of the lateral width 85 at the outlet downstream end 42.

Returning to the broader discussion of FIGS. 3-5, the outlet section 40 generally defines an air flow path, approximately following the outlet central axis 48, from the outlet upstream end 41 to the outlet downstream end 42. The air flow path may be substantially straight or substantially curved. Generally, the outlet section 40 may be configured to direct air entering the outlet upstream end 41 into a different direction upon exiting the outlet downstream end 42. The air flow path may be characterized by the central axis of the air flow. Where the air flow path is curved, the air flow central axis may have a compound curvature, including bends and/or twists in multiple directions. For example, the plane of principal curvature may be substantially orthogonal to the lateral direction, e.g., the direction along the lateral width 83 of the interior of the outlet section 40 at the outlet upstream end 41.

The air flow may converge within the outlet section 40. In one configuration to create a generally converging air flow path, the outlet upstream end 41 is larger than the outlet downstream end 42. Specifically, the outlet section may have an open area at the outlet upstream end 41 that is larger than the open area at the outlet downstream end 41.

The outlet section 40 may include outlet sound dampening material 49 to reduce noise generated by air flow through the air diffuser 14. The outlet sound dampening material 49 may be the same material as optional neck sound dampening material 39, may have similar characteristics as the optional neck sound dampening material 39, and/or may be continuous with the optional neck sound dampening material 39. Generally, the outlet sound dampening material 49 is located along the interior surface(s) of the outlet section 40 and may be directly or indirectly coupled to an interior surface of the outlet section 40. The outlet sound dampening material 49 may be composed of a continuous section of material and/or a patchwork of material sections. The outlet sound dampening material 49 may cover all, substantially all, most, and/or a majority of the interior of the outlet section 40. For example, the outlet sound dampening material 49 may cover greater than 20%, greater than 40% greater than 50%, greater than 60%, greater than 75%, greater than 90%, about 50%, about 75%, or about 100% of the interior of the outlet section 40. The outlet section 40 may be completely free or selectively free of outlet sound dampening material 49. For example, where the interior of the outlet section 40 generally has a transverse surface 90 and a lateral surface 89 (as best viewed in FIGS. 4 and 5 respectively), the lateral surface 89 may be substantially covered by outlet sound dampening material 49 and/or the transverse surface 90 may be substantially free of outlet sound dampening material 49.

Returning to the broader discussion of FIGS. 3-5, the air diffuser 14 also comprises a flow controller 50, which is located generally in the interior of air diffuser 14, typically within the inlet section 20, the neck section 30, and/or the interface between the inlet section 20 and the neck section 30. The flow controller 50 may be proximate to the inlet downstream end 22 and the neck upstream end 31. Further, the flow controller 50 may be configured to couple, and/or be operatively coupled, to the inlet section 20 and/or the neck section 30.

The flow controller 50 may be configured to create an air pressure differential, thereby regulating the downstream air pressure within and/or exiting the air diffuser 14. The pressure differential, when present, is generated within and/or by the flow controller 50. Hence, the flow controller may be configured to create and/or maintain a pressure differential from the air diffuser upstream end 17, the inlet upstream end 21, and/or the flow controller upstream end 51 (generally the high pressure end) to the inlet downstream end 22, the flow controller downstream end 52, the neck downstream end 32, the outlet downstream end 42, and/or the air diffuser downstream end 18 (generally the low pressure end). The pressure differential may be a pressure above a predetermined threshold, a pressure range, and/or a differential pressure of greater than 2 kPa, greater than 4 kPa, greater than 6 kPa, greater than 8 kPa, greater than 10 kPa, greater than 15 kPa, greater than 20 kPa, less than 20 kPa, less than 15 kPa, less than 10 kPa, less than 8 kPa, less than 6 kPa, less than 4 kPa, and/or 2-10 kPa.

The flow controller 50 may be configured to create flow resistance, thereby regulating the total flow (e.g., regulating the volumetric flow, the mass flow, and/or the pressure) of air within, and/or into, the air diffuser 14. The flow resistance, when present, is generated across the flow controller 50 from the upstream end 51 to the downstream end 52. Hence, the flow controller 50 may be configured to restrict air flow from the air diffuser upstream end 17 and/or the inlet upstream end 21 to the inlet downstream end 22, the neck downstream end 32, the outlet downstream end 42, and/or the air diffuser downstream end 18. Additionally or alternatively, the flow controller 50 may be configured to create backpressure at the air diffuser upstream end 17 and/or the inlet upstream end 21. The backpressure may be used to regulate and/or restrict air flow through the air diffuser 14 and/or may be used to direct air flow through auxiliary air conditioning system components, e.g., through optional branching tube 25 (which may ultimately direct air to personal air outlets, e.g., gaspers). Where the inlet section 20 defines a diverging air flow path, the expansion of the air flow volume upstream of the flow controller 50 may increase the static air pressure in that region (relative to no expansion). The static pressure may be used to direct air flow through auxiliary air conditioning system components.

The flow controller 50 generally includes one or more vanes 54 that define one or more flow channels 56 that are configured to transmit air through the flow controller 50. Vanes 54 generally are oriented to direct air through the flow channels 56. Vanes 54 also may be described as a blade, a membrane, a diaphragm, a flap, a leaf, a leaflet, a fin, a ridge, a nodule, a baffle, a louver, a disc, and/or a poppet. The flow controller 50 may include 1, 2, 3, 4, 5, 6, 7, 8, 9, 10, 11, 12, 2-12, 4-12, 6-10, at least 5, at least 8, and/or at least 12 vanes 54. The vanes 54 may define 1, 2, 3, 4, 5, 6, 7, 8, 9, 10, 11, 12, 2-12, 4-12, 6-10, at least 5, at least 8, and/or at least 12 flow channels 56.

Generally, the flow controller 50 is configured to fit within the air diffuser 14, typically within the inlet section 20 and/or the neck section 30, the flow controller 50 having a profile substantially the same as the interior of the nearby section. The flow controller 50 may have a characteristic dimension, i.e., a lateral width, a transverse breadth, a diameter, and/or an effective diameter, that is greater than 30 mm, greater than 40 mm, greater than 50 mm, greater than 60 mm, greater than 80 mm, greater than 100 mm, less than 100 mm, less than 80 mm, less than 60 mm, less than 50 mm, 30-100 mm, and/or 40-60 mm. The flow controller 50 may have a thickness that is less than 8 mm, less than 6 mm, less than 4 mm, less than 3 mm, less than 2 mm, greater than 1 mm, greater than 2 mm, greater than 3 mm, greater than 4 mm, 1-8 mm, and/or 2-4 mm. The flow controller 50 may be spaced away from the air diffuser upstream end 17 by greater than 4 mm, greater than 6 mm, greater than 8 mm, greater than 10 mm, greater than 12 mm, greater than 15 mm, greater than 20 mm, greater than 25 mm, greater than 30 mm, greater than 40 mm, greater than 50 mm, greater than 60 mm, greater than 80 mm, greater than 100 mm, less than 150 mm, less than 100 mm, less than 80 mm, less than 60 mm, less than 50 mm, 4-100 mm, and/or 10-80 mm. The flow controller 50 may be spaced away from the air diffuser downstream end 18 by greater than 20 mm, greater than 25 mm, greater than 30 mm, greater than 40 mm, greater than 50 mm, greater than 60 mm, greater than 80 mm, greater than 100 mm, greater than 150 mm, greater than 200 mm, greater than 300 mm, greater than 400 mm, greater than 500 mm, less than 500 mm, less than 400 mm, less than 300 mm, less than 200 mm, less than 150 mm, less than 100 mm, less than 80 mm, less than 60 mm, less than 50 mm, 50-500 mm, and/or 100-300 mm. The distance between the flow controller 50 and the air diffuser downstream end 18 along the longitudinal direction is also called the air channel length 79 downstream of the flow controller 50.

The flow controller 50 may include, and optionally may be, a passive pressure controller 70. The passive pressure controller 70, when present, is a passive device that, in response to conditions within the air diffuser 14, changes its configuration, conformation, geometry, etc. The changes to the passive pressure controller 70 are induced by the conditions without resort to an actuator or external control. For example, the passive pressure controller 70 may be directly or indirectly actuated by air pressure in the inlet section 20 (e.g., by air velocity changes through the passive pressure controller 70 that result in air pressure changes in the inlet section 20). Generally, the passive pressure controller 70 may be regarded as a normally-open passive valve that partially closes in response to air flow through the valve and/or air pressure upstream of the valve. For example, the passive pressure controller 70 may include, and optionally may be, a normally-open valve, a poppet valve, a butterfly valve, a diaphragm valve, and/or a pressure regulator.

The passive pressure controller 70 may be configured to affect air flow through the passive pressure controller 70 in response to a pressure differential across the passive pressure controller 70. For example, the passive pressure controller 70 may be configured to maintain a substantially constant air flow through the passive pressure controller 70 when an air pressure in the inlet section 20 is greater than a predefined threshold. The substantially constant air flow may be greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 L/min, greater than 900 L/min, greater than 1,000 L/min, greater than 1,100 L/min, greater than 1,200 L/min, greater than 1,300 L/min, less than 1,500 L/min, less than 1,300 L/min, and/or 900-1,300 L/min. The related predefined threshold pressure may be greater than 60 kPa, greater than 70 kPa, greater than 75 kPa, greater than 80 kPa, greater than 90 kPa, greater than 100 kPa, less than 120 kPa, less than 100 kPa, 70-120 kPa, 70-102 kPa, 70-90 kPa, about 90 kPa, about 80 kPa, and/or about 75 kPa.

By maintaining a substantially constant flow through the passive pressure controller 70, and, therefore, the air diffuser 14, air diffusers 14 are configured to reject excess upstream air flow in the associated air conditioning system 12. An air conditioning system 12 with plural air diffusers 14 (as shown in the example of FIG. 2) may thus be configured to distribute air flow to substantially all the air diffusers 14, and to distribute the air flow substantially evenly between the plurality of air diffusers 14. Additionally or alternatively, the air flow through each air diffuser 14 may be substantially controlled by the passive pressure controller 70 rather than the air flow 11 into the air diffuser upstream end 17 and/or air flow distributed by the associated air conditioning system 12.

The passive pressure controller 70 generally includes vanes 54 that are mobile and/or elastically deformable. The vanes 54 of the passive pressure controller 70 respond to air pressure differentials across the passive pressure controller 70. The air pressure differential across the passive pressure controller 70 may be due to the air flow through the passive pressure controller 70. As the vanes 54 respond to air pressure differentials, the flow channels 56 are opened and/or closed. Generally, the vanes 54 are biased to maintain one or more of the flow channels 56 in an open state in the absence of an air pressure differential greater than a predetermined threshold. As the air pressure differential increases (e.g., due to increased air flow velocity), one or more of the flow channels 56 is at least partially closed. The momentum change of the air as it passes through the flow channels 56 in the passive pressure controller 70 may cause a pressure differential and provide the reactive force to at least partially close at least one flow channel 56. In the illustrative, non-exclusive example of a passive pressure controller 70 with a plurality of flow channels 56, a fraction of the flow channels 56 may close and/or an open area of one or more (and optionally all) of the flow channels 56 may decrease in response to a sufficiently high pressure differential.

Vanes 54 of the passive pressure controller 70 may be (each independently) elastically deformable and/or elastically coupled to the interior of the air diffuser 14 (e.g., to neck section interior 34). The vanes 54 may be configured to be displaced (e.g., elastically deform, rotate, etc.) in response to the pressure differentials described with respect to the opening and closing of flow channels 56. The vanes 54 may be relatively thin and/or may have a thickness of less than 6 mm, less than 4 mm, less than 3 mm, less than 2 mm, less than 1 mm, greater than 0.5 mm, greater than 1 mm, greater than 2 mm, greater than 3 mm, greater than 4 mm, 1-6 mm, and/or 0.5-4 mm.

Pressure differentials that may affect the vanes 54 and/or the passive pressure controller 70 as described herein may be a pressure differential from the air diffuser upstream end 17, the inlet upstream end 21, and/or the flow controller upstream end 51 to the inlet downstream end 22, the flow controller downstream end 52, the neck downstream end 32, the outlet downstream end 42, and/or the air diffuser downstream end 18. The pressure differential may be a pressure above a predetermined threshold, a pressure range, and/or a pressure differential of greater than 2 kPa, greater than 4 kPa, greater than 6 kPa, greater than 8 kPa, greater than 10 kPa, greater than 15 kPa, greater than 20 kPa, less than 20 kPa, less than 15 kPa, less than 10 kPa, less than 8 kPa, less than 6 kPa, less than 4 kPa, and/or 2-10 kPa.

Additionally or alternatively, the flow controller 50 may include, and optionally may be, a vortex inducer 72. The vortex inducer 72, when present, is configured to induce some tangential air flow 11 as air passes through the vortex inducer 72. That is, the generally axial flow that flows through the inlet section 20 and to the vortex inducer 72 is redirected, in the vortex inducer 72, to swirl around the central axis 78 of the vortex inducer 72. The tangential flow component of the air flow 11 may be a substantial fraction of the axial flow component of the air flow 11 as the air flow exits the vortex inducer 72. For example, the ratio of tangential air flow to axial air flow is at least 0.2, at least 0.3, at least 0.4, at least 0.5, at least 0.8, at least 1, at least 1.2, at most 5, at most 3, at most 2, at most 1.5, 0.2-5, 0.3-3, 0.4-3, 0.5-3, 0.5-1.5, 0.8-3, and/or 0.8-1.5. The ratio of tangential air flow to axial air flow may be determined at the downstream end of the vortex inducer 72 (i.e., the downstream end 52 of the flow controller 50) and/or in the neck section 30 downstream of the vortex inducer 72. The ratio may be the velocity ratio or the mass flow ratio. The vortex inducer 72 may be configured to create a vortex of air in the neck section 30 and/or a vortex of air that extends from the vortex inducer 72 into the outlet section 40 and/or to, or beyond, the air diffuser downstream end 18.

Generally, the vortex inducer 72 may be described with a central axis 78. The central axis 78 of the vortex inducer 72 may be continuous with the inlet central axis 28 and/or the neck central axis 38. The vortex inducer 72 may have characteristic transverse and/or lateral dimensions corresponding to the characteristic dimensions of the proximate interior of the air diffuser 14 and/or related to the longitudinal dimension of at least one of the air diffuser 14, the inlet section 20, neck section 30, and outlet section 40. For example, a lateral width, a transverse breadth, a diameter, and/or an effective diameter of the vortex inducer 72 may be less than 50%, less than 20%, less than 15%, less than 10%, less than 8%, less than 5%, less than 4%, less than 2%, greater than 1%, greater than 2%, greater than 4%, greater than 5%, greater than 8%, greater than 10%, greater than 15%, and/or greater than 20% of the air channel length 19 of the air diffuser 14 and/or the air channel length 79 downstream of the vortex inducer 72.

The vortex inducer 72 may define and/or include one or more vanes 54 that are configured to allow air to pass through the vortex inducer 72 in a helical manner. The vanes 54 of the vortex inducer 72 may define one or more angled flow channels 76. The vanes 54 and/or the angled flow channels 76 may be curved and/or helical. The vanes 54 and/or the angled flow channels 76 may have a pitch, an average pitch, an effective pitch, and/or an angle, relative to the central axis 78 of the vortex inducer 72, of about 10°, about 20°, about 30°, about 40°, about 45°, about 50°, about 60°, about 70°, about 80°, about 90°, 20°-70°, 30°-70°, 30°-60°, 40°-70°, and/or 40°-60°. The vanes 54 of the vortex inducer 72 may be connected together at a central point or component, e.g., a central hub 74. For example, the hub 74 may connect to one, at least one, two, at least two, or all of the vanes 54. Alternatively, the vortex inducer 72 may not include a hub 74. The hub 74, when present, generally occludes all, or substantially all, air flow through the hub 74, i.e., the hub 74 generally has no flow channel 56. Where one or more vanes 54 do not connect to a hub 74, the vanes 54 may protrude from the interior of the air diffuser 14 and into the air flow path. The angled flow channels 76 defined by protruding vanes 54 may merge with a central flow channel 56 that generally follows the central axis 78. Protruding vanes 54 may only partially occlude the interior of the air diffuser 14 and/or may have a radial length that is less than half a characteristic lateral and/or transverse dimension (e.g., a lateral width, a transverse breadth, a diameter, and/or an effective diameter) of the vortex inducer 72. For example, the radial length of protruding vanes 54 may be less than 50%, less than 20%, less than 15%, less than 10%, less than 8%, less than 5%, less than 4%, less than 2%, greater than 1%, greater than 2%, greater than 4%, greater than 5%, greater than 8%, greater than 10%, greater than 15%, and/or greater than 20% of a characteristic lateral and/or transverse dimension of the vortex inducer 72.

The vanes 54 of the vortex inducer 72 and/or the angled flow channels 76 may be arranged in a radial pattern (arranged like rays or radii) and/or a circumferential pattern (arranged like segments of a circumference). In such patterns, the individual vanes 54 and/or angled flow channels 76 may be described as angularly and/or radially spaced apart. Typically, such patterns are centered on and/or arranged around the central axis 78 and/or the hub 74.

Figure 6:
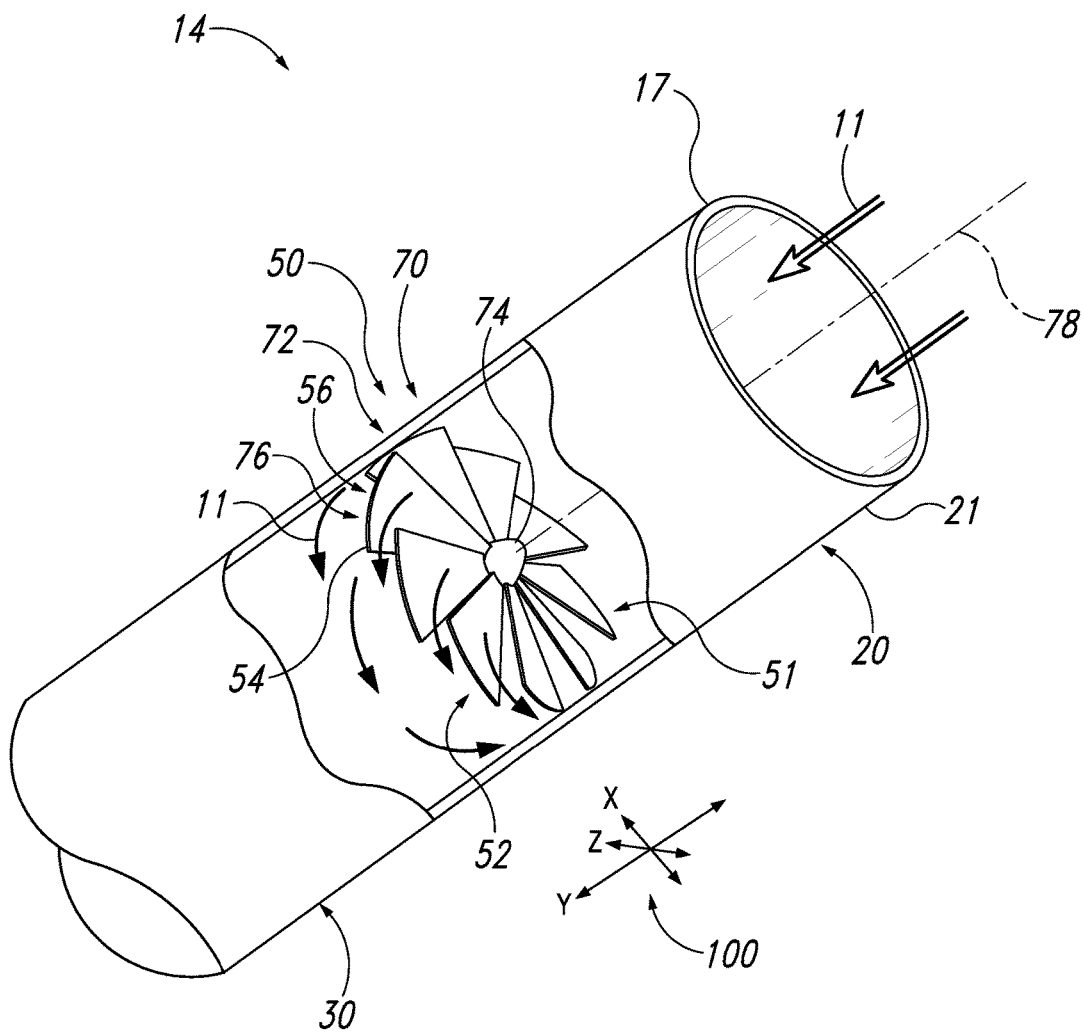
FIG. 6 is detail of an illustrative, non-exclusive example of a flow controller.
Figure 7:
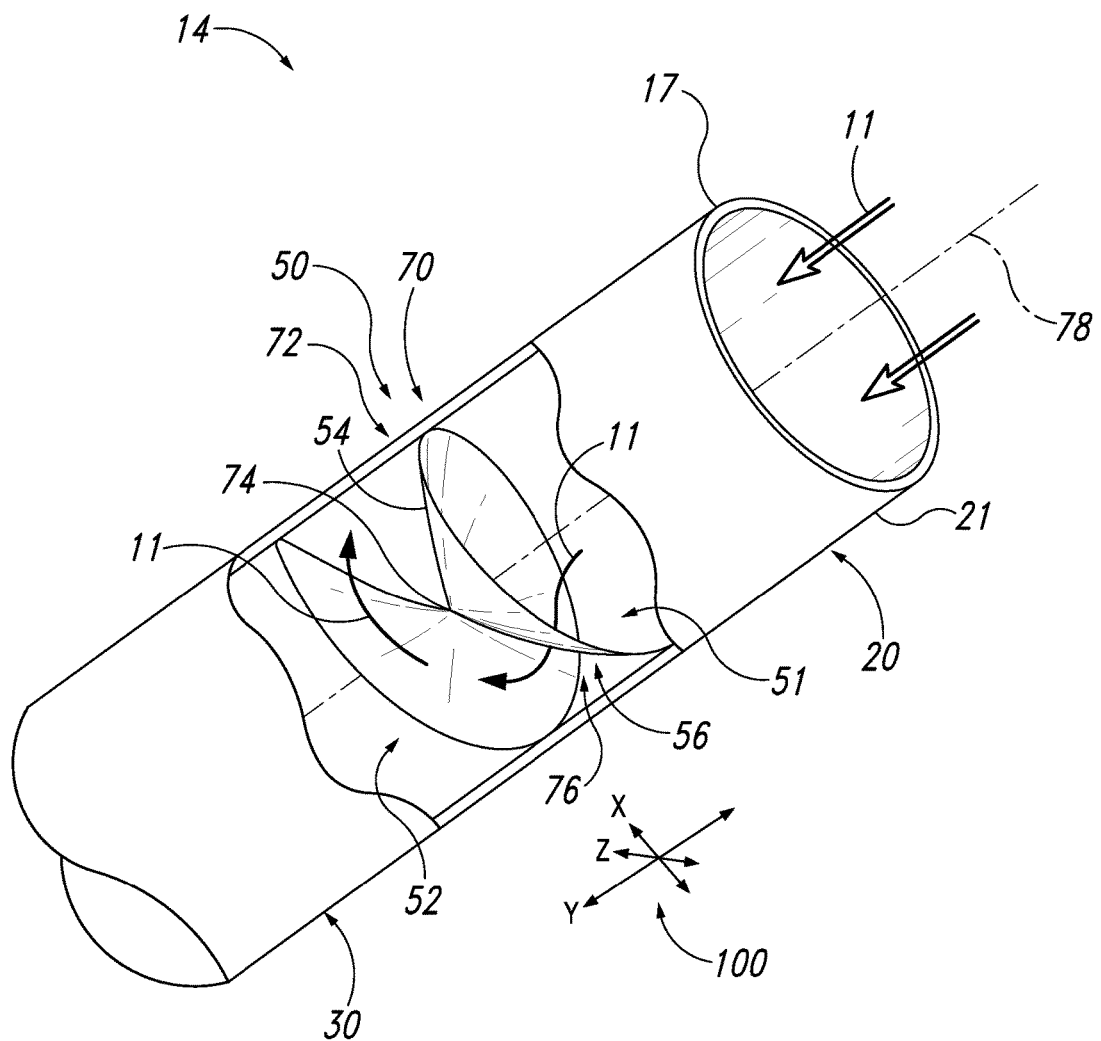
FIG. 7 is detail of another illustrative, non-exclusive example of a flow controller.

Illustrative, non-exclusive examples of flow controllers 50 are shown in FIGS. 6-7. For example, FIG. 6 depicts a flow controller 50 that is in the form of a fixed fan (a fan shape that does not rotate about its central axis). The fixed fan includes a plurality of vanes 54 and a plurality of angled flow channels 76 that are configured to impart circular motion (around the longitudinal axis) to the generally longitudinal air flow 11 that enters the flow controller 50. Hence, the embodiment shown in FIG. 6 is also a vortex inducer 72. The vanes 54 may be elastically deformable and/or elastically coupled to the interior of the air diffuser 14 and/or the central hub 74. The arrangement of vanes 54 shown allows the vanes to elastically deform to close the angled flow channels 76 in response to an increase in the pressure differential across the flow controller 50. Hence, the embodiment shown in FIG. 6 also may be a passive pressure controller 70.

FIG. 7 depicts a flow controller 50 that is in the form of a helix. The helix is a single helical vane 54 that defines an angled flow channel 76. As with FIG. 6, the flow controller 50 of FIG. 7 is a vortex inducer 72 and may be a passive pressure controller 70 (when the vane 54 is elastically deformable and/or elastically coupled to the interior of the air diffuser 14 and/or the central hub 74). Other optional embodiments of flow controllers 50 may include louvers and/or orifice plates. For example, a plate with angle orifices may be configured as a vortex inducer 72. As another example, louvers may redirect air entering and/or exiting a flow controller 50 such that the flow controller 50 imparts tangential air flow and is a vortex inducer 72.

Returning to the broader discussion of FIGS. 3-5, the air diffuser 14 also may comprise an optional baffle 60, which is located generally in the interior of air diffuser 14, typically within the neck section 30, the outlet section 40, and/or the interface between the neck section 30 and the outlet section 40. The baffle 60, when present, is located downstream of the flow controller 50, and hence is generally toward the air diffuser downstream end 18. The baffle 60 may be proximate to the neck downstream end 32 and the outlet upstream end 41. Further, the baffle 60 may be configured to couple, and/or be operatively coupled, to the neck section 30 and/or the outlet section 40.

Generally, the baffle 60 is substantially perpendicular to or oblique to, the neck central axis 38 and/or the outlet central axis 48. The relationship between the baffle 60 and the neck central axis 38 and/or the outlet central axis 48 may be characterized by an angle 92, as best viewed in FIG. 5. The angle 92 between the baffle 60 and the neck central axis 38 and/or between the baffle 60 and the outlet central axis 48 may be greater than 10°, greater than 15°, greater than 20°, greater than 25°, greater than 30°, greater than 35°, greater than 40°, greater than 45°, greater than 50°, greater than 55°, greater than 60°, greater than 65°, greater than 70°, greater than 75°, greater than 85°, less than 90°, less than 75°, less than 70°, less than 65°, less than 60°, less than 55°, less than 50°, less than 45°, less than 40°, less than 35°, less than 30°, less than 25°, less than 20°, less than 15°, 10°-50°, 15°-45°, 20°-45°, 25°-35°, about 90°, about 75°, about 60°, about 45°, about 30°, and/or about 15°.

The baffle 60 may be configured to create flow resistance and/or create backpressure within the air diffuser 14. The flow resistance is generally between the neck upstream end 31 and the outlet downstream end 42. The backpressure is generally backpressure at the neck upstream end 31. Generally, the baffle 60 may be configured to spread air flow across the lateral width 85 of the outlet section 40 at the outlet downstream end 42. One configuration, which may spread the air flow and maintain a quiet air flow, includes a tortuous air flow path from the neck upstream end 31 to the outlet downstream end 42. Generally, the flow restriction of the baffle 60 prevents direct transmission of upstream noise and redirects the air flow to interact with the interior of the neck section, the interior of the outlet section, the optional neck sound dampening material 39, and/or the optional outlet sound dampening material 49.

The baffle 60 may be a baffle plate 64 characterized by a first end 66, a second end 67. The baffle plate 64 may substantially span the lateral width 81 of the interior of the neck section 30 at the neck downstream end 32 and/or the lateral width 83 of the interior of the outlet section 40 at the outlet upstream end 41. Additionally or alternatively, the baffle plate 64 may substantially span the interior of the neck section 30 and/or the outlet section 40 across the lateral direction. The baffle plate 60 may be substantially flat, may include flat regions, curved regions, and/or rounded regions.

Generally, the baffle plate 64 is configured to substantially restrict air flow near the first end 66 and/or the second end 67. For example, the first end 66 and/or the second end 67 may be coupled close to one or more interior surfaces of the neck section 30 and/or the outlet section 40, for example the transverse surface 88 of the interior of the neck section 30 and/or the transverse surface 90 of the interior of the outlet section 40. Where the first end 66 and/or the second end 67 are near an interior surface of the air diffuser 14, the interior surface may include sound dampening material, e.g., neck sound dampening material 39 and outlet sound dampening material 49, or may be essentially free of sound dampening material proximate the first end 66 and/or the second end 67. Where the neck section 30 includes neck sound dampening material 39, the neck sound dampening material 39 may define a material gap near the first end 66 and/or the second end 67, e.g., along a transverse surface 88 of the interior of the neck section 30. Where the outlet section 40 includes sound dampening material 49, the outlet sound dampening material 49 may define a material gap near the first end 66 and/or the second end 67, e.g., along a transverse surface 90 of the interior of the outlet section 40.

Generally, the baffle plate 64 defines one or more gaps 65 between the baffle plate 64 and the interior of the neck section 30 and/or the outlet section 40. The gap 65 may substantially span the interior of the neck section 30 and/or the outlet section 40 across the lateral direction, in which case the gap 65 would be between the baffle plate 64 and a lateral surface 87 of the interior of the neck section 30 and/or a lateral surface 89 of the interior of the outlet section 40. The gap 65 may have a lateral width approximately the same as the lateral width 81 at the neck downstream end 32 and/or the lateral width 83 at the outlet upstream end 41. The gap 65 may have an open area that is less than 50%, less than 40%, less than 35%, less than 30%, less than 25%, less than 20%, less than 15%, less than 12%, less than 10%, less than 8%, greater than 5%, greater than 8%, greater than 10%, greater than 12%, greater than 15%, greater than 20%, greater than 25%, greater than 30%, greater than 35%, greater than 40%, 5-50%, 8-30%, 8-20%, 10-35%, about 8%, about 10%, about 12%, about 15%, about 20%, about 25%, about 30%, and/or about 33% of the open area of the outlet downstream end 42. The interior surface of the neck section 30 and/or the outlet section 40 near the gap 65 may be substantially flat near the gap 65, may have a curvature away from the baffle plate 64, and/or may have a curvature toward the baffle plate 64.

The baffle plate 64 may have a third end 68 near the gap 65 and fourth end 69 opposite the third end 68. The third end 68 may be configured to smoothly split air flow and may be wedge-shaped, rounded and/or bulbous. The third end 68 may be upstream or downstream of the fourth end 69. The fourth end 69 is generally near the interior surface of the neck section 30 and/or the outlet section 40, and may be operatively coupled to the neck section 30 and/or the outlet section 40. For example, the fourth end 69 may be near a lateral surface 87 of the interior of the neck section 30 and/or near a lateral surface 89 of the interior of the outlet section 40. Further, the baffle plate 64, may define a dead volume, a volume where air may enter and exit essentially from one direction, between the fourth end 69 and the interior surface of the neck section 30 and/or the interior surface of the outlet section 40.

Further examples of aircraft, aircraft air conditioning systems, air diffusers, general design considerations, and use thereof are disclosed in U.S. patent application Ser. No. 14/010,775, filed Aug. 27, 2013, the entire disclosure of which is incorporated herein by reference for all purposes.

Illustrative, non-exclusive examples of inventive subject matter according to the present disclosure are described in the following enumerated paragraphs.

A1. An aircraft cabin air diffuser comprising:
an inlet section with an open interior;
a neck section with an open interior, downstream of the inlet section;
an outlet section with an open interior, wherein the outlet section is downstream of the neck section; and
a flow controller within the open interior of the neck section.

A1.1. The air diffuser of paragraph A1, wherein the inlet section has an interior profile that is substantially round and/or substantially oval.

A1.2. The air diffuser of any of paragraphs A1-A1.1, wherein the inlet section has an interior profile and the outlet section has an interior profile that is different, optionally substantially different, than the interior profile of the inlet section.

A1.3. The air diffuser of any of paragraphs A1-A1.1, wherein the outlet section has an interior profile that is substantially oblong and/or substantially rectangular.

A2. The air diffuser of any of paragraphs A1-A1.3, wherein the flow controller is configured to create an air pressure differential of greater than 2 kPa, greater than 4 kPa, greater than 6 kPa, greater than 8 kPa, greater than 10 kPa, greater than 15 kPa, greater than 20 kPa, less than 20 kPa, less than 15 kPa, less than 10 kPa, less than 8 kPa, less than 6 kPa, less than 4 kPa, and/or 2-10 kPa.

A2.1. The air diffuser of paragraph A2, wherein the air pressure differential is from the inlet section to the outlet section.

A2.2. The air diffuser of any of paragraphs A2-A2.1, wherein the air pressure differential is from an upstream end of the flow controller to a downstream end of the flow controller.

A3. The air diffuser of any of paragraphs A1-A2.2, wherein the flow controller is configured to restrict air flow from the inlet section to the outlet section.

A4. The air diffuser of any of paragraphs A1-A3, wherein the flow controller is proximate the inlet section.

A5. The air diffuser of any of paragraphs A1-A4, wherein the flow controller is operatively coupled to the inlet section and/or the neck section.

A6. The air diffuser of any of paragraphs A1-A5, wherein the flow controller includes, and optionally is, a passive pressure controller, optionally configured to affect air flow through the passive pressure controller in response to an air pressure differential across the passive pressure controller.

A6.1. The air diffuser of paragraph A6, wherein the passive pressure controller is configured to maintain a substantially constant air flow through the passive pressure controller when an air pressure in the inlet section is greater than a predefined threshold, optionally wherein the substantially constant air flow is greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 L/min, greater than 900 L/min, greater than 1,000 L/min, greater than 1,100 L/min, greater than 1,200 L/min, greater than 1,300 L/min, less than 1,500 L/min, less than 1,300 L/min, and/or 900-1,300 L/min, and optionally wherein the predefined threshold is greater than 60 kPa, greater than 70 kPa, greater than 75 kPa, greater than 80 kPa, greater than 90 kPa, greater than 100 kPa, less than 120 kPa, less than 100 kPa, 70-120 kPa, 70-102 kPa, 70-90 kPa, about 90 kPa, about 80 kPa, and/or about 75 kPa.

A6.2. The air diffuser of any of paragraphs A6-A6.1, wherein the passive pressure controller is configured to be actuated by air pressure in the inlet section and/or by air velocity through the passive pressure controller.

A6.3. The air diffuser of any of paragraphs A6-A6.2, wherein the passive pressure controller includes one or more vanes that define one or more flow channels.

A6.3.1. The air diffuser of paragraph A6.3, wherein the one or more vanes are configured to decrease an open area of the one or more flow channels in response to an increase in an air pressure differential from the inlet section to the outlet section.

A6.3.2. The air diffuser of any of paragraphs A6.3-A6.3.1, wherein the one or more vanes are biased to maintain the one or more flow channels in an open state in the absence of an air pressure differential between the inlet section and the outlet section.

A6.3.3. The air diffuser of any of paragraphs A6.3-A6.3.2, wherein at least one vane, optionally all vanes, is elastically coupled to the interior of the neck section.

A6.3.4. The air diffuser of any of paragraphs A6.3-A6.3.3, wherein at least one vane, optionally all vanes, is configured to elastically deform in response to an air pressure differential from the inlet section to the outlet section of greater than 2 kPa, greater than 4 kPa, greater than 6 kPa, greater than 8 kPa, greater than 10 kPa, greater than 15 kPa, greater than 20 kPa, less than 20 kPa, less than 15 kPa, less than 10 kPa, less than 8 kPa, less than 6 kPa, less than 4 kPa, and/or 2-10 kPa.

A6.3.5. The air diffuser of any of paragraphs A6.3-A6.3.4, wherein the passive pressure controller has an upstream end and a downstream end and wherein at least one vane, optionally all vanes, is configured to elastically deform in response to an air pressure differential, from the upstream end of the passive pressure controller to the downstream end of the passive pressure controller, of greater than 2 kPa, greater than 4 kPa, greater than 6 kPa, greater than 8 kPa, greater than 10 kPa, greater than 15 kPa, greater than 20 kPa, less than 20 kPa, less than 15 kPa, less than 10 kPa, less than 8 kPa, less than 6 kPa, less than 4 kPa, and/or 2-10 kPa.

A6.3.6. The air diffuser of any of paragraphs A6.3-A6.3.5, wherein a thickness of at least one vane, optionally all vanes, is less than 6 mm, less than 4 mm, less than 3 mm, less than 2 mm, less than 1 mm, greater than 0.5 mm, greater than 1 mm, greater than 2 mm, greater than 3 mm, greater than 4 mm, 1-6 mm, and/or 0.5-4 mm.

A6.3.7. The air diffuser of any of paragraphs A6.3-A6.3.6, wherein at least one vane, optionally all vanes, includes, optionally is, a blade, a membrane, a diaphragm, a flap, a leaf, a leaflet, a fin, a ridge, a nodule, a baffle, a louver, a disc, and/or a poppet.

A6.4. The air diffuser of any of paragraphs A6-A6.3.7, wherein the passive pressure controller includes, optionally is, a normally-open valve, a poppet valve, a butterfly valve, a diaphragm valve, and/or a pressure regulator.

A7. The air diffuser of any of paragraphs A1-A6.4, wherein the flow controller includes, and optionally is, a vortex inducer.

A7.1. The air diffuser of paragraph A7, wherein the vortex inducer is configured to induce tangential air flow as air passes through the vortex inducer, optionally wherein a ratio of tangential air flow to axial air flow is at least 0.2, at least 0.3, at least 0.4, at least 0.5, at least 0.8, at least 1, at least 1.2, at most 5, at most 3, at most 2, at most 1.5, 0.2-5, 0.3-3, 0.4-3, 0.5-3, 0.5-1.5, 0.8-3, and/or 0.8-1.5.

A7.2. The air diffuser of any of paragraphs A7-A7.1, wherein the vortex inducer is configured to create a vortex of air in the neck section, optionally a vortex of air that extends from the vortex inducer into the outlet section.

A7.3. The air diffuser of any of paragraphs A7-A7.2, wherein the vortex inducer has a characteristic dimension that is a lateral width, a transverse breadth, a diameter, and/or an effective diameter, wherein the air diffuser has an air channel length, optionally downstream of the vortex inducer, and wherein the ratio of the characteristic dimension to the air channel length is less than 50%, less than 20%, less than 15%, less than 10%, less than 8%, less than 5%, less than 4%, less than 2%, greater than 1%, greater than 2%, greater than 4%, greater than 5%, greater than 8%, greater than 10%, greater than 15%, and/or greater than 20%.

A7.4. The air diffuser of any of paragraphs A7-A7.3, wherein the vortex inducer includes a central axis, optionally wherein the central axis of the vortex inducer is continuous with an/the inlet central axis, and optionally wherein the central axis of the vortex inducer is continuous with a/the neck central axis.

A7.5. The air diffuser of any of paragraphs A7-A7.4, wherein the vortex inducer includes one or more, optionally a plurality of, vanes that define one or more, optionally a plurality of, angled flow channels.

A7.5.1. The air diffuser of paragraph A7.5, wherein the plurality of angled flow channels are arranged in a radial pattern and/or a circumferential pattern, optionally around a central axis of the vortex inducer and/or a hub of the vortex inducer.

A7.5.2. The air diffuser of any of paragraphs A7.5-A7.5.1, wherein the vortex inducer includes 1, 2, 3, 4, 5, 6, 7, 8, 9, 10, 11, 12, 2-12, 4-12, 6-10, at least 5, at least 8, and/or at least 12 vanes.

A7.5.3. The air diffuser of any of paragraphs A7.5-A7.5.2, wherein the one or more vanes define 1, 2, 3, 4, 5, 6, 7, 8, 9, 10, 11, 12, 2-12, 4-12, 6-10, at least 5, at least 8, and/or at least 12 angled flow channels.

A7.5.4. The air diffuser of any of paragraphs A7.5-A7.5.3, wherein the angled flow channels are angled about 10°, about 20°, about 30°, about 40°, about 45°, about 50°, about 60°, about 70°, about 80°, about 90°, 20°-70°, 30°-70°, 30°-60°, 40°-70°, and/or 40°-60° from a/the central axis of the vortex inducer.

A7.5.5. The air diffuser of any of paragraphs A7.5-A7.5.4, wherein the vanes and/or the angled flow channels are curved and/or helical.

A7.5.6. The air diffuser of any of paragraphs A7.5-A7.5.5, wherein at least two, optionally all, of the angled flow channels are radially and/or angularly spaced apart.

A7.5.7. The air diffuser of any of paragraphs A7.5-A7.5.6, wherein the vortex inducer includes a central hub, optionally that connects to at least one vane.

A7.5.7.1. The air diffuser of paragraph A7.5.7, wherein the central hub connects at least two, and optionally all of the, vanes together.

A7.5.8. The air diffuser of any of paragraphs A7.5-A7.5.7.1, wherein at least one vane, optionally all vanes, is coupled to the interior of the neck section.

A7.5.9. The air diffuser of any of paragraphs A7.5-A7.5.8, wherein at least one vane, optionally all vanes, includes, optionally is, a blade, a membrane, a diaphragm, a flap, a leaf, a leaflet, a fin, a ridge, a nodule, a baffle, a louver, a disc, and/or a poppet.

A7.6. The air diffuser of any of paragraphs A7-A7.5.9, wherein the vortex inducer includes, optionally is, a fixed fan, a helix, an orifice plate, and/or a louver.

A8. The air diffuser of any of paragraphs A1-A7.6, wherein the inlet section has an inlet upstream end and an inlet downstream end, optionally wherein the inlet section has an open area at the inlet upstream end that is smaller than an open area at the inlet downstream end.

A9. The air diffuser of any of paragraphs A1-A8, wherein the inlet section is a tube, a generally cylindrical shell, and/or a generally tapered shell.

A10. The air diffuser of any of paragraphs A1-A9, wherein the interior profile of the inlet section is an interior profile at an/the inlet upstream end and/or an interior profile at an/the inlet downstream end.

A11. The air diffuser of any of paragraphs A1-A10, wherein the inlet section is elongated between an/the inlet upstream end and an/the inlet downstream end.

A12. The air diffuser of any of paragraphs A1-A11, wherein the inlet section has an inlet central axis between an/the inlet upstream end and an/the inlet downstream end, optionally wherein the inlet central axis is substantially straight.

A13. The air diffuser of any of paragraphs A1-A12, wherein the interior of the inlet section defines an air flow path that is substantially straight and/or substantially diverging.

A14. The air diffuser of any of paragraphs A1-A13, wherein the inlet section includes a branching tube configured to create an air flow path directed away from an/the inlet downstream end.

A15. The air diffuser of any of paragraphs A1-A14, wherein the neck section has a neck upstream end and a neck downstream end, optionally wherein the neck section has a first region, proximate to the neck upstream end, that is a tube and/or a generally cylindrical shell.

A16. The air diffuser of any of paragraphs A1-A15, wherein the neck section has a second region, proximate to a/the neck downstream end, that is a tube and/or generally an open box.

A17. The air diffuser of any of paragraphs A1-A16, wherein the neck section has a transition region between a/the neck upstream end and a/the neck downstream end, wherein the transition region has a non-uniform interior profile, optionally wherein the interior of the transition region defines a smooth air flow path, has arcuate surfaces, has rounded corners, has no sharp corners, and/or is essentially free of sharp corners.

A18. The air diffuser of any of paragraphs A1-A17, wherein the neck section at the neck upstream end has an interior profile that is substantially round and/or substantially oval.

A19. The air diffuser of any of paragraphs A1-A18, wherein the neck section at a/the neck downstream end has an interior profile that is substantially round, substantially oval, substantially oblong, and/or substantially rectangular.

A20. The air diffuser of any of paragraphs A1-A19, wherein the neck section has a first interior profile at a/the neck upstream end and a second interior profile at a/the neck downstream end, wherein the first interior profile and the second interior profile are different.

A21. The air diffuser of any of paragraphs A1-A20, wherein the neck section is elongated between a/the neck upstream end and a/the neck downstream end.

A22. The air diffuser of any of paragraphs A1-A21, wherein the neck section has a neck central axis between a/the neck upstream end and a/the neck downstream end, optionally wherein the neck central axis is substantially straight or substantially curved, and optionally wherein the neck central axis is continuous with an/the inlet central axis.

A23. The air diffuser of any of paragraphs A1-A22, wherein the interior of the neck section defines a substantially straight air flow path.

A24. The air diffuser of any of paragraphs A1-A23, wherein the interior of the neck section defines a substantially curved air flow path.

A24.1. The air diffuser of paragraph A24, wherein a plane of principal curvature of the air flow path is substantially orthogonal to a lateral width of the interior of the neck section at a/the neck downstream end.

A25. The air diffuser of any of paragraphs A1-A24.1, wherein the neck section is configured to direct air entering a/the neck upstream end into a different direction upon exiting a/the neck downstream end.

A26. The air diffuser of any of paragraphs A1-A25, wherein the neck section includes a neck sound dampening material, optionally wherein the neck sound dampening material includes fire resistant materials and/or aramid fibers.

A26.1. The air diffuser of paragraph A26, wherein the neck sound dampening material is coupled to an interior surface of the neck section.

A26.2. The air diffuser of any of paragraphs A26-A26.1, wherein the neck sound dampening material is continuous within the neck section.

A26.3. The air diffuser of any of paragraphs A26-A26.2, wherein the neck sound dampening material covers most, a majority and/or substantially all, of the interior of the neck section.

A26.4. The air diffuser of any of paragraphs A26-A26.3, wherein the neck sound dampening material covers a fraction of the interior of the neck section, and wherein the fraction is greater than 20%, greater than 40% greater than 50%, greater than 60%, greater than 75%, greater than 90%, about 50%, about 75%, or about 100%.

A26.5. The air diffuser of any of paragraphs A26-A26.4, wherein the interior of the neck section at a/the neck downstream end has a lateral surface and a transverse surface, wherein the lateral surface is substantially covered by neck sound dampening material, and optionally wherein the transverse surface is substantially free of neck sound dampening material.

A27. The air diffuser of any of paragraphs A1-A26.5, wherein the neck section has an open area at a/the neck upstream end that is smaller than an open area at a/the neck downstream end.

A28. The air diffuser of any of paragraphs A1-A27, wherein the interior of the neck section at a/the neck downstream end has a lateral width that is larger than a characteristic dimension of the interior of the neck section at a/the neck upstream end, wherein the characteristic dimension is a lateral width, a transverse breadth, a diameter, and/or an effective diameter, and optionally wherein the ratio of the characteristic dimension to the lateral width is less than 50%, less than 40%, less than 30%, less than 25%, less than 20%, less than 15%, less than 12%, less than 10%, less than 8%, 8-50%, 8-25%, about 20%, about 15%, and/or about 12%.

A29. The air diffuser of any of paragraphs A1-A28, wherein the interior of the neck section at a/the neck downstream end has a transverse breadth that is about equal to or smaller than a characteristic dimension of the interior of the neck section at a/the neck upstream end, wherein the characteristic dimension is a lateral width, a transverse breadth, a diameter, and/or an effective diameter, optionally wherein the ratio of the transverse breadth to the characteristic dimension is less than 120%, less than 100%, less than 80%, less than 60%, less than 50%, less than 40%, less than 30%, less than 25%, less than 20%, 20-100%, 30-50%, about 100%, about 50%, about 33%, and/or about 25%.

A30. The air diffuser of any of paragraphs A1-A29, wherein the interior of the neck section at a/the neck downstream end has a lateral width and a transverse breadth, wherein the lateral width is larger than the transverse breadth, and optionally wherein the ratio of the transverse breadth to the lateral width is less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%.

A31. The air diffuser of any of paragraphs A1-A30, wherein a characteristic dimension of the interior of the neck section at a/the neck upstream end is greater than 20 mm, greater than 30 mm, greater than 40 mm, greater than 50 mm, greater than 60 mm, greater than 80 mm, greater than 100 mm, less than 100 mm, less than 80 mm, less than 60 mm, less than 50 mm, 30-100 mm, and/or 40-60 mm, and wherein the characteristic dimension is a lateral width, a transverse breadth, a diameter, and/or an effective diameter.

A32. The air diffuser of any of paragraphs A1-A31, wherein a lateral width of the interior of the neck section at a/the neck downstream end is greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm.

A33. The air diffuser of any of paragraphs A1-A32, wherein a lateral width of the interior of the neck section at a/the neck downstream end is substantially the same as or less than a length of a/the neck central axis.

A34. The air diffuser of any of paragraphs A1-A33, wherein the outlet section is a tube, generally an open box, and/or generally an open tapered box.

A35. The air diffuser of any of paragraphs A1-A34, wherein the outlet section includes an outlet downstream end, wherein the interior profile of the outlet section is an interior profile at the outlet downstream end.

A35.1. The air diffuser of paragraph A35, wherein the outlet section includes an outlet upstream end, wherein the outlet section has an interior profile at the outlet upstream end that is substantially round, substantially oval, substantially oblong, and/or substantially rectangular.

A36. The air diffuser of any of paragraphs A1-A35.1, wherein the outlet section is elongated between an/the outlet upstream end and an/the outlet downstream end.

A37. The air diffuser of any of paragraphs A1-A36, wherein the outlet section has an outlet central axis between an/the outlet upstream end and an/the outlet downstream end, optionally wherein the outlet central axis is substantially straight or substantially curved, and optionally wherein the outlet central axis is continuous with a/the neck central axis.

A38. The air diffuser of any of paragraphs A1-A37, wherein the interior of the outlet section defines an air flow path that is substantially straight and/or substantially converging.

A39. The air diffuser of any of paragraphs A1-A38, wherein the interior of the outlet section defines a substantially curved air flow path.

A39.1. The air diffuser of paragraph A39, wherein a plane of principal curvature of the air flow path is substantially orthogonal to a lateral width of the interior of the outlet section at an/the outlet upstream end.

A40. The air diffuser of any of paragraphs A1-A39.1, wherein the outlet section is configured to direct air entering an/the outlet upstream end into a different direction upon exiting an/the outlet downstream end.

A41. The air diffuser of any of paragraphs A1-A40, wherein the outlet section includes an outlet sound dampening material, optionally wherein the outlet sound dampening material includes fire resistant materials and/or aramid fibers.

A41.1. The air diffuser of paragraph A41, wherein the outlet sound dampening material is coupled to an interior surface of the outlet section.

A41.2. The air diffuser of any of paragraphs A41-A41.1, wherein the outlet sound dampening material is continuous within the outlet section.

A41.3. The air diffuser of any of paragraphs A41-A41.2, wherein the outlet sound dampening material covers most, a majority and/or substantially all, of the interior of the outlet section.

A41.4. The air diffuser of any of paragraphs A41-A41.3, wherein the outlet sound dampening material covers a fraction of the interior of the outlet section, and wherein the fraction is greater than 20%, greater than 40% greater than 50%, greater than 60%, greater than 75%, greater than 90%, about 50%, about 75%, or about 100%.

A41.5. The air diffuser of any of paragraphs A41-A41.4, wherein the interior of the outlet section at an/the outlet upstream end has a lateral surface and a transverse surface, wherein the lateral surface is substantially covered by outlet sound dampening material, and optionally wherein the transverse surface is substantially free of outlet sound dampening material.

A42. The air diffuser of any of paragraphs A1-A41.5, wherein the outlet section has an open area at an/the outlet upstream end that is larger than an open area at an/the outlet downstream end.

A43. The air diffuser of any of paragraphs A1-A42, wherein the interior of the outlet section at an/the outlet upstream end has a lateral width and a transverse breadth, wherein the lateral width is larger than the transverse breadth, and optionally wherein the ratio of the transverse breadth to the lateral width is less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%.

A44. The air diffuser of any of paragraphs A1-A43, wherein a lateral width of the interior of the outlet section at an/the outlet upstream end is greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm.

A45. The air diffuser of any of paragraphs A1-A44, wherein a transverse breadth of the interior of the outlet section at an/the outlet upstream end is greater than 10 mm, greater than 20 mm, greater than 30 mm, greater than 40 mm, greater than 50 mm, greater than 70 mm, greater than 100 mm, greater than 150 mm, less than 200 mm, less than 150 mm, less than 100 mm, less than 70 mm, less than 50 mm, less than 40 mm, less than 30 mm, less than 20 mm, 10-200 mm, 20-100 mm, 20-70 mm, about 20 mm, and/or about 50 mm.

A46. The air diffuser of any of paragraphs A1-A45, wherein the interior of the outlet section at an/the outlet downstream end has a lateral width and a transverse breadth, wherein the lateral width is larger than the transverse breadth, and optionally wherein the ratio of the transverse breadth to the lateral width is less than 50%, less than 40%, less than 30%, less than 25%, less than 20%, less than 15%, less than 12%, less than 10%, less than 8%, less than 7%, less than 6%, less than 5%, less than 4%, 4-40%, 5-25%, 10-25%, about 25%, about 20%, about 15%, and/or about 12%.

A47. The air diffuser of any of paragraphs A1-A46, wherein a lateral width of the interior of the outlet section at an/the outlet downstream end is greater than 100 mm, greater than 200 mm, greater than 300 mm, greater than 400 mm, greater than 500 mm, less than 500 mm, less than 400 mm, less than 300 mm, less than 200 mm, 100-500 mm, 200-300 mm, and/or about 280 mm.

A48. The air diffuser of any of paragraphs A1-A47, wherein a transverse breadth of the interior of the outlet section at an/the outlet downstream end is greater than 10 mm, greater than 20 mm, greater than 30 mm, greater than 40 mm, greater than 50 mm, greater than 70 mm, greater than 100 mm, greater than 150 mm, less than 200 mm, less than 150 mm, less than 100 mm, less than 70 mm, less than 50 mm, less than 40 mm, less than 30 mm, less than 20 mm, 10-200 mm, 20-100 mm, 20-70 mm, about 20 mm, and/or about 50 mm.

A49. The air diffuser of any of paragraphs A1-A48, wherein a lateral width of the interior of the outlet section at an/the outlet downstream end is greater than a length of a/the outlet central axis, optionally wherein the ratio of the length to the lateral width is less than 80%, less than 60%, less than 50%, less than 40%, less than 30%, less than 25%, less than 20%, 20-80%, 25-60%, about 60%, about 50%, and/or about 40%.

A50. The air diffuser of any of paragraphs A1-A49, further comprising an interior baffle that is downstream of the flow controller.

A50.1. The air diffuser of paragraph A50, wherein the interior baffle is configured to restrict air flow from a/the neck upstream end to an/the outlet downstream end.

A50.2. The air diffuser of any of paragraphs A50-A50.1, wherein the interior baffle is configured to create backpressure at a/the neck upstream end.

A50.3. The air diffuser of any of paragraphs A50-A50.2, wherein the interior baffle is configured to spread air flow across a lateral width of the interior of an/the outlet downstream end.

A50.4. The air diffuser of any of paragraphs A50-A50.3, wherein the interior baffle is configured to create a tortuous air flow path within the air diffuser.

A50.5. The air diffuser of any of paragraphs A50-A50.4, wherein the interior baffle is configured to prevent direct transmission of upstream noise.

A50.6. The air diffuser of any of paragraphs A50-A50.5, wherein the interior baffle is configured to redirect air flow to interact with the interior of the neck section, the interior of the outlet section, a/the neck sound dampening material, and/or a/the outlet sound dampening material.

A50.7. The air diffuser of any of paragraphs A50-A50.6, wherein the interior baffle is proximate to a/the neck downstream end and proximate to an/the outlet upstream end.

A50.8. The air diffuser of any of paragraphs A50-A50.7, wherein the interior baffle is operatively coupled to the neck section and/or the outlet section.

A50.9. The air diffuser of any of paragraphs A50-A50.8, wherein the interior baffle is substantially perpendicular to or oblique to, a/the neck central axis, optionally wherein an angle between the interior baffle and the neck central axis is greater than 10°, greater than 15°, greater than 20°, greater than 25°, greater than 30°, greater than 35°, greater than 40°, greater than 45°, greater than 50°, greater than 55°, greater than 60°, greater than 65°, greater than 70°, greater than 75°, greater than 85°, less than 90°, less than 75°, less than 70°, less than 65°, less than 60°, less than 55°, less than 50°, less than 45°, less than 40°, less than 35°, less than 30°, less than 25°, less than 20°, less than 15°, 10°-50°, 15°-45°, 20°-45°, 25°-35°, about 90°, about 75°, about 60°, about 45°, about 30°, and/or about 15°.

A50.10. The air diffuser of any of paragraphs A50-A50.9, wherein the interior baffle is substantially perpendicular to or oblique to, an/the outlet central axis, optionally wherein an angle between the interior baffle and the outlet central axis is greater than 10°, greater than 15°, greater than 20°, greater than 25°, greater than 30°, greater than 35°, greater than 40°, greater than 45°, greater than 50°, greater than 55°, greater than 60°, greater than 65°, greater than 70°, greater than 75°, greater than 85°, less than 90°, less than 75°, less than 70°, less than 65°, less than 60°, less than 55°, less than 50°, less than 45°, less than 40°, less than 35°, less than 30°, less than 25°, less than 20°, less than 15°, 10°-50°, 15°-45°, 20°-45°, 25°-35°, about 90°, about 75°, about 60°, about 45°, about 30°, and/or about 15°.

A50.11. The air diffuser of any of paragraphs A50-A50.10, wherein the interior baffle is a baffle plate with a first end and a second end.

A50.11.1. The air diffuser of paragraph A50.11, wherein the baffle plate is substantially flat.

A50.11.2. The air diffuser of any of paragraphs A50.11-A50.11.1, wherein the baffle plate substantially spans a lateral width of the interior of the neck section and/or a lateral width of the interior of the outlet section.

A50.11.3. The air diffuser of any of paragraphs A50.11-A50.11.2, wherein the baffle plate is configured to substantially restrict air flow near the first end and/or the second end.

A50.11.4. The air diffuser of any of paragraphs A50.11-A50.11.3, wherein, when the neck section includes neck sound dampening material, the neck sound dampening material defines a material gap near the first end of the baffle plate and/or near the second end of the baffle plate.

A50.11.5. The air diffuser of any of paragraphs A50.11-A50.11.4, wherein, when the outlet section includes outlet sound dampening material, the outlet sound dampening material defines a material gap near the first end of the baffle plate and/or near the second end of the baffle plate.

A50.11.6. The air diffuser of any of paragraphs A50.11-A50.11.5, wherein the baffle plate defines a gap, optionally one gap, in the interior of the neck section and/or the interior of the outlet section.

A50.11.6.1. The air diffuser of paragraph A50.11.6, wherein the gap substantially spans a lateral width of the interior of the neck section and/or a lateral width of the interior of the outlet section.

A50.11.6.2. The air diffuser of any of paragraphs A50.11.6-A50.11.6.1, wherein the gap has an open area that is less than 50%, less than 40%, less than 35%, less than 30%, less than 25%, less than 20%, less than 15%, less than 12%, less than 10%, less than 8%, greater than 5%, greater than 8%, greater than 10%, greater than 12%, greater than 15%, greater than 20%, greater than 25%, greater than 30%, greater than 35%, greater than 40%, 5-50%, 8-30%, 8-20%, 10-35%, about 8%, about 10%, about 12%, about 15%, about 20%, about 25%, about 30%, and/or about 33% of an open area of a/the outlet downstream end.

A50.11.6.3. The air diffuser of any of paragraphs A50.11.6-A50.11.6.2, wherein the gap is proximate to an interior surface of the neck section and/or an interior surface of the outlet section, optionally wherein the interior surface of the neck section and/or the interior surface of the outlet section is substantially flat near the gap, has a curvature away from the baffle plate, and/or has a curvature toward the baffle plate.

A50.11.6.4. The air diffuser of any of paragraphs A50.11.6-A50.11.6.3, wherein the baffle plate has a third end near the gap and a fourth end opposite the third end, wherein the third end is upstream or downstream of the fourth end.

A50.11.6.5. The air diffuser of any of paragraphs A50.11.6-A50.11.6.4, wherein the baffle plate has a third end near the gap that is configured to smoothly split air flow.

A50.11.6.6. The air diffuser of any of paragraphs A50.11.6-A50.11.6.5, wherein the baffle plate has a third end near the gap that is wedge-shaped, rounded and/or bulbous.

A51. The air diffuser of any of paragraphs A1-A50.11.6.6, wherein the air diffuser is configured to flow air at greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 L/min, greater than 900 L/min, greater than 1,000 L/min, greater than 1,100 L/min, greater than 1,200 L/min, greater than 1,300 L/min, less than 1,500 L/min, less than 1,300 L/min, and/or 900-1,300 L/min.

A52. The air diffuser of any of paragraphs A1-A51, wherein the air diffuser is configured to generate a sound level that is less than 20 dB, less than 10 dB, less than 5 dB, less than 3 dB, less than 2 dB, or less than 1 dB more than ambient aircraft cabin noise when air flows through the inlet section to the outlet section, and optionally wherein the sound level includes the sound level at frequencies of 0.1 kHz, 0.2 kHz, 0.5 Hz, 1 kHz, 2 kHz, 3 kHz, 4 kHz, 5 kHz, 8 kHz, 10 kHz, 12 kHz, 15 kHz, 20 kHz, 0.1-10 kHz, 0.5-4 kHz, 1-4 kHz, 2-4 kHz, 3-10 kHz, 5-10 kHz, greater than 5 kHz, and/or greater than 8 kHz.

A53. The air diffuser of any of paragraphs A1-A52, wherein the air diffuser is configured to generate a speech interference level of less than 55 dB, less than 52 dB, less than 50 dB, less than 48 dB, less than 46 dB, or less than 44 dB when air flows through the inlet section to the outlet section.

A54. An aircraft air conditioning system comprising:
the aircraft cabin air diffuser of any of paragraphs A1-A53;
wherein the aircraft air conditioning system is configured to supply air through the aircraft cabin air diffuser.

A55. An aircraft comprising a plurality of the aircraft cabin air diffusers of any of paragraphs A1-A53.

A55.1. The aircraft of paragraph A55, wherein the aircraft includes less than one aircraft cabin air diffuser for every two rated occupants, for every three rated occupants, and/or for every four rated occupants, and optionally wherein the aircraft includes less than 0.5, less than 0.4, less than 0.37, less than 0.33, less than 0.30, less than 0.28, less than 0.26, less than 0.24, less than 0.22, less than 0.2, about 0.4, about 0.37, about 0.33, about 0.3, about 0.25, and/or about 0.22 air diffusers per rated occupant.

A55.2. The aircraft of any of paragraphs A55-A55.1, wherein the aircraft is configured to maintain an aircraft cabin pressure of greater than 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, 70-102 kPa, about 90 kPa, about 80 kPa, and/or about 75 kPa.

B1. A method of supplying air to an aircraft cabin, comprising: supplying air through the aircraft cabin air diffuser of any of paragraphs A1-A53.

B2. The method of paragraph B1, wherein the supplying includes supplying while the aircraft is in flight.

B3. The method of any of paragraphs B1-B2, wherein the supplying includes flowing air through the aircraft cabin air diffuser at greater than 700 g/min, greater than 800 g/min, greater than 900 g/min, greater than 1,000 g/min, greater than 1,100 g/min, greater than 1,200 g/min, less than 1,500 g/min, less than 1,200 g/min, 800-1,200 g/min, greater than 800 L/min, greater than 900 L/min, greater than 1,000 L/min, greater than 1,100 L/min, greater than 1,200 L/min, greater than 1,300 L/min, less than 1,500 L/min, less than 1,300 L/min, and/or 900-1,300 L/min.

B4. The method of any of paragraphs B1-B3, wherein the supplying includes supplying with a sound level less than 20 dB, less than 10 dB, less than 5 dB, less than 3 dB, less than 2 dB, or less than 1 dB more than ambient aircraft cabin noise, and optionally wherein the sound level includes frequencies of 0.1 kHz, 0.2 kHz, 0.5 kHz, 1 kHz, 2 kHz, 3 kHz, 4 kHz, 5 kHz, 8 kHz, 10 kHz, 12 kHz, 15 kHz, 20 kHz, 0.1-10 kHz, 0.5-4 kHz, 1-4 kHz, 2-4 kHz, 3-10 kHz, 5-10 kHz, greater than 5 kHz, and/or greater than 8 kHz.

B5. The method of any of paragraphs B1-B4, wherein the supplying includes supplying with a speech interference level less than 55 dB, less than 52 dB, less than 50 dB, less than 48 dB, less than 46 dB, or less than 44 dB.

B6. The method of any of paragraphs B1-B5, wherein the aircraft cabin includes occupants, and wherein the supplying includes using less than one aircraft cabin air diffuser for every two occupants, for every three occupants, and/or for every four occupants, and optionally wherein the aircraft includes less than 0.5, less than 0.4, less than 0.37, less than 0.33, less than 0.30, less than 0.28, less than 0.26, less than 0.24, less than 0.22, less than 0.2, about 0.4, about 0.37, about 0.33, about 0.3, about 0.25, and/or about 0.22 air diffusers per rated occupant.

B7. The method of any of paragraphs B1-B6, further comprising:
maintaining a pressure in the aircraft cabin of greater than about 60 kPa, greater than 70 kPa, greater than 75 kPa, greater than 80 kPa, greater than 90 kPa, greater than 100 kPa, less than 120 kPa, less than 100 kPa, less than 80 kPa, 70-80 kPa, 70-90 kPa, 70-102 kPa, about 90 kPa, about 80 kPa, and/or about 75 kPa.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of apparatuses and steps of methods disclosed herein are not required of all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

In the event that any patents or patent applications are incorporated by reference herein and (1) define a term in a manner and/or (2) are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

The invention claimed is:

1. An aircraft cabin air diffuser comprising:
an inlet section with an open interior;
a neck section with an open interior, downstream of the inlet section;
an outlet section with an open interior, wherein the outlet section is downstream of the neck section; and
a flow controller within the open interior of the neck section;
wherein the neck section includes a neck upstream end downstream of the inlet section and a neck downstream end downstream of the neck upstream end; wherein an interior of the neck section at the neck upstream end has an upstream lateral width; wherein the interior of the neck section at the neck downstream end has a downstream lateral width that is larger than the upstream lateral width; wherein the flow controller is positioned between the inlet section and the neck upstream end; wherein the flow controller is a passive pressure controller configured to affect air flow through the passive pressure controller in response to an air pressure differential across the passive pressure controller, and further wherein the passive pressure controller is configured to be actuated by air velocity through the passive pressure controller, wherein the passive pressure controller includes one or more vanes that define one or more flow channels, and wherein the one or more vanes are configured to decrease an open area of the one or more flow channels in response to an increase in an air pressure differential from the inlet section to the outlet section.

2. The air diffuser of claim 1, wherein the passive pressure controller is configured to maintain a substantially constant air flow of greater than 700 grams per minute (g/min) through the passive pressure controller when an air pressure in the inlet section is greater than a predefined threshold of greater than 60 kilopascals (kPa).

3. The air diffuser of claim 1, wherein the passive pressure controller is configured to be actuated by air pressure in the inlet section.

4. The air diffuser of claim 1, wherein the one or more vanes are biased to maintain the one or more flow channels in an open state in the absence of the air pressure differential between the inlet section and the outlet section.

5. The air diffuser of claim 1, wherein the passive pressure controller has an upstream end and a downstream end, wherein the one or more vanes are configured to deform in response to an air pressure differential, from the upstream end of the passive pressure controller to the downstream end of the passive pressure controller, of 2-10 kPa.

6. The air diffuser of claim 1, wherein the flow controller is configured to create an air pressure differential of 2-10 kPa from an upstream end of the flow controller to a downstream end of the flow controller.

7. The air diffuser of claim 1, wherein the air diffuser is configured to generate a speech interference level of less than 50 decibels (dB) when air flows through the inlet section to the outlet section at a rate of greater than 700 g/min.

8. The air diffuser of claim 1, wherein the inlet section has an open interior profile that is substantially round, and wherein the outlet section has an open interior profile that is substantially oblong.

9. The air diffuser of claim 1, wherein the flow controller is a vortex inducer.

10. The air diffuser of claim 9, wherein the vortex inducer is configured to create a vortex of air in the neck section.

11. The air diffuser of claim 9, wherein the vortex inducer is configured to induce tangential air flow as air passes through the vortex inducer.

12. The air diffuser of claim 9, wherein the vortex inducer has an effective diameter, wherein the air diffuser has an air channel length downstream of the vortex inducer, and wherein a ratio of the effective diameter to the air channel length is less than 20%.

13. The air diffuser of claim 9, wherein the vortex inducer is configured to induce tangential air flow as air passes through the vortex inducer, wherein a ratio of tangential air flow to axial air flow is at least 0.2.

14. An aircraft comprising a plurality of the aircraft cabin air diffusers of claim 1, wherein the air diffusers are configured to flow air at a rate of greater than 700 g/min with a speech interference level less than 50 dB.

15. The aircraft of claim 14, wherein the aircraft is configured to maintain an aircraft cabin pressure of 70-102 kPa.

16. An aircraft cabin air diffuser comprising:
an inlet section with an open interior;
a neck section with an open interior, downstream of the inlet section;
an outlet section with an open interior, wherein the outlet section is downstream of the neck section; and
a flow controller within the open interior of the neck section;
wherein the neck section includes a neck upstream end downstream of the inlet section and a neck downstream end downstream of the neck upstream end; wherein an interior of the neck section at the neck upstream end has an upstream lateral width; wherein the interior of the neck section at the neck downstream end has a downstream lateral width that is larger than the upstream lateral width; wherein the flow controller is positioned between the inlet section and the neck upstream end; wherein the flow controller is a passive pressure controller configured to affect air flow through the passive pressure controller in response to an air pressure differential across the passive pressure controller, wherein the passive pressure controller is configured to be actuated by air velocity through the passive pressure controller, wherein the passive pressure controller includes one or more vanes that define one or more flow channels, and wherein the one or more vanes are biased to maintain the one or more flow channels in an open state in the absence of an air pressure differential between the inlet section and the outlet section.

17. An aircraft cabin air diffuser comprising:
an inlet section with an open interior;
a neck section with an open interior, downstream of the inlet section;
an outlet section with an open interior, wherein the outlet section is downstream of the neck section; and
a flow controller within the open interior of the neck section;
wherein the neck section includes a neck upstream end downstream of the inlet section and a neck downstream end downstream of the neck upstream end; wherein an interior of the neck section at the neck upstream end has an upstream lateral width; wherein the interior of the neck section at the neck downstream end has a downstream lateral width that is larger than the upstream lateral width; wherein the flow controller is positioned between the inlet section and the neck upstream end; wherein the flow controller is a passive pressure controller configured to affect air flow through the passive pressure controller in response to an air pressure differential across the passive pressure controller, wherein the passive pressure controller has an upstream end and a downstream end, wherein the passive pressure controller includes at least one vane configured to elastically deform in response to an air pressure differential, from the upstream end of the passive pressure controller to the downstream end of the passive pressure controller, of 2-10 kPa.

18. An aircraft cabin air diffuser comprising:
an inlet section with an open interior;
a neck section with an open interior, downstream of the inlet section;
an outlet section with an open interior, wherein the outlet section is downstream of the neck section; and
a flow controller within the open interior of the neck section;
wherein the neck section includes a neck upstream end downstream of the inlet section and a neck downstream end downstream of the neck upstream end; wherein an interior of the neck section at the neck upstream end has an upstream lateral width; wherein the interior of the neck section at the neck downstream end has a downstream lateral width that is larger than the upstream lateral width; wherein the flow controller is positioned between the inlet section and the neck upstream end; and wherein the flow controller is a passive pressure controller configured to affect air flow through the passive pressure controller in response to an air pressure differential across the passive pressure controller; and
wherein the air diffuser is configured to generate a speech interference level of less than 50 decibels (dB) when air flows through the inlet section to the outlet section at a rate of greater than 700 g/min.

19. An aircraft comprising:
a plurality of aircraft cabin air diffusers, wherein each of the plurality of aircraft cabin air diffusers includes:
(i) an inlet section with an open interior;
(ii) a neck section with an open interior, downstream of the inlet section;
(iii) an outlet section with an open interior, wherein the outlet section is downstream of the neck section; and
(iv) a flow controller within the open interior of the neck section;
wherein the neck section includes a neck upstream end downstream of the inlet section and a neck downstream end downstream of the neck upstream end; wherein an interior of the neck section at the neck upstream end has an upstream lateral width; wherein the interior of the neck section at the neck downstream end has a downstream lateral width that is larger than the upstream lateral width; wherein the flow controller is positioned between the inlet section and the neck upstream end; and wherein the flow controller is a passive pressure controller configured to affect air flow through the passive pressure controller in response to an air pressure differential across the passive pressure controller; and
wherein each of the plurality of air diffusers is configured to flow air at a rate of greater than 700 g/min with a speech interference level less than 50 dB.

20. The aircraft of claim 19, wherein the aircraft is configured to maintain an aircraft cabin pressure of 70-102 kPa.

* * * * *